(12) United States Patent
Haakansson

(10) Patent No.: US 10,981,109 B2
(45) Date of Patent: Apr. 20, 2021

(54) WET SCRUBBER TOWER WITH PLATES BETWEEN NOZZLES FOR WET FLUE GAS DESULPHURISATION AND PARTICULATE MATTER REMOVAL

(71) Applicant: General Electric Technology GmbH, Baden (SE)

(72) Inventor: Rikard Bjoern Sture Haakansson, Kronoberg (SE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/612,503

(22) PCT Filed: May 8, 2018

(86) PCT No.: PCT/EP2018/061914
§ 371 (c)(1),
(2) Date: Nov. 11, 2019

(87) PCT Pub. No.: WO2018/206599
PCT Pub. Date: Nov. 15, 2018

(65) Prior Publication Data
US 2020/0197863 A1 Jun. 25, 2020

(30) Foreign Application Priority Data
May 11, 2017 (EP) .................... 17170576

(51) Int. Cl.
*B01D 53/14* (2006.01)
*B01D 53/18* (2006.01)
(Continued)

(52) U.S. Cl.
CPC ........... *B01D 53/504* (2013.01); *B01D 47/06* (2013.01); *B01D 53/1481* (2013.01);
(Continued)

(58) Field of Classification Search
CPC ...... B01D 2258/0283; B01D 2257/302; B01D 2247/08; B01D 53/18; B01D 47/06;
(Continued)

(56) References Cited

U.S. PATENT DOCUMENTS 3,456,709 A * 7/1969 Vegeby .................... B01D 1/14
159/4.02
3,708,958 A 1/1973 Stuit et al.
(Continued)

FOREIGN PATENT DOCUMENTS

CN 105879590 A * 8/2016 ........... B01D 47/021
CN 107413176 * 12/2017 ............. B01D 47/12
WO WO2014128261 A1 8/2014

OTHER PUBLICATIONS

International Search Report of the International Searching Authority for PCT/EP2018/061914 dated Sep. 21, 2018.

*Primary Examiner* — Timothy C Vanoy
(74) *Attorney, Agent, or Firm* — Grogan, Tuccillo & Vanderleeden, LLP

(57) ABSTRACT

A wet scrubber (14) useful for reducing flue gas sulphur oxides and particulate matter comprising an at least first spray level arrangement (34) arranged horizontally in a wet scrubber tower (16). The at least first spray level arrangement (34) may comprise downwardly, upwardly, and/or combination downwardly and upwardly spraying nozzles (40). Arranged between the nozzles (40) is a plurality of single plates (76, 76A) and/or double plates (82) to direct flue gas flow into absorbent liquid or slurry atomized by the nozzles (40) for flue gas sulphur oxide and particulate matter reduction.

16 Claims, 15 Drawing Sheets

(51) Int. Cl.
*B01D 53/50* (2006.01)
*B01D 53/78* (2006.01)
*B01D 47/06* (2006.01)
*F23J 15/04* (2006.01)

(52) U.S. Cl.
CPC .............. *B01D 53/18* (2013.01); *B01D 53/78* (2013.01); *F23J 15/04* (2013.01); *B01D 2257/302* (2013.01); *B01D 2258/0283* (2013.01); *F23J 2215/20* (2013.01)

(58) Field of Classification Search
CPC .......... B01D 2251/606; B01D 53/1481; B01D 2259/124; B01D 53/504; B01D 2247/107; B01D 53/78; B01D 2251/404; B01D 2251/602; F23J 2215/20
See application file for complete search history.

(56) References Cited

U.S. PATENT DOCUMENTS

| | | | | |
|---|---|---|---|---|
| 4,263,021 A | * | 4/1981 | Downs | B01D 53/504 |
| | | | | 261/113 |
| 5,246,471 A | * | 9/1993 | Bhat | B01D 53/504 |
| | | | | 261/113 |
| 9,776,125 B2 | | 10/2017 | Strandberg | |

\* cited by examiner

WET SCRUBBER TOWER WITH PLATES BETWEEN NOZZLES FOR WET FLUE GAS DESULPHURISATION AND PARTICULATE MATTER REMOVAL

TECHNICAL FIELD

In general, the present disclosure relates to a wet flue gas desulphurisation (WFGD) system useful for reducing flue gas sulphur oxides ($SO_x$), and for reducing flue gas particulate matter. More specifically, the present disclosure relates to a wet scrubber tower WFGD system equipped with plates arranged within the wet scrubber tower for flue gas particulate matter removal.

Additionally, the present disclosure relates to a method of reducing flue gas sulphur oxides, such as sulphur dioxide, and flue gas particulate matter using a wet scrubber comprising a wet scrubber tower, an at least first spray level arrangement within the wet scrubber tower, nozzles on the at least first spray level arrangement to which an absorption liquid is supplied for atomisation by the nozzles, and a plurality of plates arranged within the wet scrubber tower to increase flue gas flow velocity within areas of absorption liquid atomisation and to increase flue gas contact with absorption liquid atomised within the wet scrubber tower. The resultant increased flue gas flow velocity and increased flue gas contact with absorption liquid increases flue gas sulphur oxides removal and flue gas particulate matter removal.

BACKGROUND

Combustion of a fuel, such as coal, oil, peat, waste, etc., in a combustion plant, such as a power plant, generates a hot flue gas containing, among other components, sulphur oxides, SON, such as sulphur dioxide, $SO_2$, and particulate matter, such as dust and ash. Sulphur dioxide is an environmental pollutant, as are other components of the flue gas. Hence, it is necessary to remove at least a portion of the sulphur dioxide and particulate matter contained in the generated flue gas before releasing the flue gas into the atmosphere.

WO 2008/042554 describes a wet scrubber in which a perforated plate is arranged adjacent to a number of atomizing nozzles. Each of the perforations in the perforated plate is aligned with a cone of absorption liquid sprayed from an atomizing nozzle. The perforated plate illustrated in WO 2008/042554 may in some cases yield a rather high flue gas pressure drop, which is not necessarily desirable, and may not be indicative of an increase in sulphur dioxide and particulate matter removal efficiency.

SUMMARY

The subject disclosure is directed to a wet flue gas desulphurization (WFGD) system equipped with a plurality of plates, and a method of using a wet scrubber of the WFGD system to reduce flue gas sulphur oxides and flue gas particulate matter more efficiently than the system and method of WO 2008/042554. As such, the subject disclosure is directed to a WFGD system comprising a wet scrubber comprising a wet scrubber tower, an at least first spray level arrangement arranged within the wet scrubber tower, nozzles arranged on the at least first spray level arrangement to which an absorption liquid is supplied for atomisation by the nozzles, and a plurality of plates arranged within the wet scrubber tower so as to not impede or obstruct nozzle spray. The plurality of plates is arranged within the wet scrubber tower to affect flue gas flow within the wet scrubber tower to increase flue gas flow velocity and to increase flue gas contact with absorption liquid atomised within the wet scrubber tower.

The subject disclosure is likewise directed to a method of using the subject wet scrubber to reduce flue gas sulphur oxides and flue gas particulate matter, the method comprising arranging a plurality of plates within a wet scrubber tower of the wet scrubber so as to not impede or obstruct nozzle spray. The plurality of plates is arranged within the wet scrubber tower to affect flue gas flow within the wet scrubber tower to increase flue gas flow velocity and to increase flue gas contact with absorption liquid atomised by nozzles, also arranged within the wet scrubber tower.

An advantage of the subject WFGD system and method is that contact between the increased velocity flue gas and the atomised absorption liquid causes an intense flue gas/absorption liquid intermixing, producing what is referred to herein as a "cloud" of intermixed flue gas and absorption liquid. This intermixed cloud of flue gas and absorption liquid yields very efficient absorption of flue gas pollutants, such as sulphur dioxide and particulate matter by the absorption liquid atomised within the wet scrubber tower.

A first WFGD system embodiment according to the present disclosure comprises a wet scrubber tower with an at least first spray level arrangement equipped with a plurality of downwardly spraying nozzles, and a plurality of single plates arranged in a pattern with respect to the downwardly spraying nozzles to increase flue gas flow velocity and to increase flue gas contact with absorption liquid atomised within the wet scrubber tower. The pattern of the plurality of single plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of upwardly spraying nozzles, and a plurality of single plates arranged in a pattern with respect to the upwardly spraying nozzles to increase flue gas flow velocity and to increase flue gas contact with absorption liquid atomised within the wet scrubber tower. The pattern of the plurality of single plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of individual and/or combination downwardly and upwardly spraying nozzles, and a plurality of single plates arranged in a pattern with respect to the downwardly and upwardly spraying nozzles to increase flue gas flow velocity and to increase flue gas contact with absorption liquid atomised within the wet scrubber tower. The pattern of the plurality of single plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement with a plurality of downwardly spraying nozzles, and a plurality of double plates arranged in a pattern with respect to the downwardly spraying nozzles to increase flue gas flow velocity and to increase flue gas contact with absorption liquid atomised within a wet scrubber tower. The pattern of the plurality of double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of upwardly spraying nozzles, and a plurality of double plates arranged in a pattern with respect to the upwardly spraying nozzles to increase flue gas flow velocity and to increase flue gas contact with absorption liquid atomised within a wet scrubber tower. The pattern of the plurality of double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of individual and/or combination downwardly and upwardly spraying nozzles, and a plurality of double plates arranged in a pattern with respect to the downwardly and upwardly spraying nozzles to increase flue gas flow velocity and to increase flue gas contact with absorption liquid atomised within a wet scrubber tower. The pattern of the plurality of double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of downwardly spraying nozzles, and a plurality of single and double plates arranged in a pattern with respect to the downwardly spraying nozzles to increase flue gas flow velocity and to increase flue gas contact with absorption liquid atomised within a wet scrubber tower. The pattern of the plurality of single and double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of upwardly spraying nozzles, and a plurality of single and double plates arranged in a pattern with respect to the upwardly spraying nozzles to increase flue gas flow velocity and to increase flue gas contact with absorption liquid atomised within a wet scrubber tower. The pattern of the plurality of single and double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another system embodiment according to the present disclosure comprises a wet scrubber tower with an at least first spray level arrangement equipped with a plurality of individual and/or combination downwardly and upwardly spraying nozzles, and a plurality of single and double plates arranged in a pattern with respect to the downwardly and upwardly spraying nozzles to increase flue gas flow velocity and to increase flue gas contact with absorption liquid atomised within a wet scrubber tower. The pattern of the plurality of single and double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

A first method according to the present disclosure comprises equipping a wet scrubber tower with an at least first spray level arrangement with a plurality of downwardly spraying nozzles, and arranging a plurality of single plates in a pattern with respect to the downwardly spraying nozzles to increase flue gas flow velocity and to increase flue gas contact with absorption liquid atomised within a wet scrubber tower. According to the method, the pattern of the plurality of single plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of upwardly spraying nozzles, and arranging a plurality of single plates in a pattern with respect to the upwardly spraying nozzles to increase flue gas flow velocity and to increase flue gas contact with absorption liquid atomised within a wet scrubber tower. According to the method, the pattern of the plurality of single plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of individual and/or combination downwardly and upwardly spraying nozzles, and arranging a plurality of single plates in a pattern with respect to the downwardly and upwardly spraying nozzles to increase flue gas flow velocity and to increase flue gas contact with absorption liquid atomised within a wet scrubber tower. According to the method, the pattern of the plurality of single plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of downwardly spraying nozzles, and arranging a plurality of double plates in a pattern with respect to the downwardly spraying nozzles to increase flue gas flow velocity and to increase flue gas contact with absorption liquid atomised within a wet scrubber tower. According to the method, the pattern of the plurality of double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of upwardly spraying nozzles, and arranging a plurality of double plates in a pattern with respect to the upwardly spraying nozzles to increase flue gas flow velocity and to increase flue gas contact with absorption liquid atomised within a wet scrubber tower. According to the method, the pattern of the plurality of double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of individual and/or combination downwardly and upwardly spraying nozzles, and arranging a plurality of double plates in a pattern with respect to the downwardly and upwardly spraying nozzles to increase flue gas flow velocity and to increase flue gas contact with absorption liquid atomised within a wet scrubber tower. According to the method, the pattern of the plurality of double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of downwardly spraying nozzles, and arranging a plurality of single and double plates in a pattern with respect to the downwardly spraying nozzles to increase flue gas flow velocity and to increase flue gas contact with absorption liquid atomised within a wet scrubber tower. According to the method, the pattern of the plurality of single and double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of upwardly spraying nozzles, and arranging a plurality of single and double plates in a pattern with respect to the upwardly spraying nozzles to increase flue gas flow velocity and to increase flue gas contact with absorption liquid atomised within a wet scrubber tower. According to the method, the pattern of the plurality of single and double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

Another method according to the present disclosure comprises equipping a wet scrubber tower with an at least first spray level arrangement with a plurality of individual and/or combination downwardly and upwardly spraying nozzles, and arranging a plurality of single and double plates in a pattern with respect to the downwardly and upwardly spraying nozzles to increase flue gas flow velocity and to increase flue gas contact with absorption liquid atomised within a wet scrubber tower. According to the method, the pattern of the plurality of single and double plates increases the flue gas flow velocity and increases flue gas contact with absorption liquid atomised within the wet scrubber tower to generate an intermixed cloud of flue gas and absorption liquid. This intermixed cloud of flue gas and absorption liquid yields very efficient absorption of flue gas pollutants, such as sulphur dioxide, and efficient capture of particulate matter.

According to the subject system embodiments and methods, open areas between adjacent single plates arranged at a common or varying angles within a common horizontal plane within the wet scrubber tower as that of the downwardly spraying nozzles, increases upward flow velocity of flue gas through the open areas to a velocity of about 5 m/s to about 15 m/s. Such arrangement of the single plates effectively reduces the cross-sectional area of the wet scrubber tower throughwhich the flue gas flows, thereby increasing flue gas flow velocity to about 5 m/s to about 15 m/s. Likewise, such arrangement of the angled single plates affects flue gas flow for increased flue gas flow into direct contact with the absorption liquid spray for increased sulphur dioxide absorption efficiency and for increased particulate matter capture efficiency by the absorption liquid. With flue gas flow velocities less than 5 m/s, absorption liquid and flue gas intermixing tends to be less efficient. Also, with flue gas flow velocities less than 5 m/s, shear force between the particulate matter in the flue gas impacting the absorption liquid droplets is relatively low thus reducing the particulate matter capture rate. Increasing flue gas flow velocity to about 5 m/s to about 15 m/s increases shear force impact between the particulate matter in the flue gas and the absorption liquid droplets thus increasing the particulate matter capture rate. With flue gas velocities greater than about 15 m/s, the flue gas pressure drop within the wet scrubber tower tends to increase to unacceptably high levels. Such high pressure drop levels are unacceptable due to the relatively large amount of energy required to pass flue gas through and out of the wet scrubber tower. Also, with flue gas velocities greater than about 15 m/s, a relatively large portion of the atomized absorption liquid becomes entrained within the flue gas, causing increased liquid loads on the wet scrubber tower mist eliminator, potentially causing an increased loss of absorption liquid from the wet scrubber.

According to the subject system embodiments and methods, open areas between adjacent single plates arranged at a common or varying angles within a common horizontal plane within the wet scrubber tower as that of the downwardly spraying nozzles, and open areas between adjacent double plates arranged at common or varying angles within a common horizontal plane within the wet scrubber tower above that of the downwardly spraying nozzles and staggered with respect to the single plates, increases upward flow velocity of flue gas through the open areas to a velocity of about 5 m/s to about 15 m/s. Such arrangement of the single and double plates effectively reduces the cross-sectional area of the wet scrubber tower throughwhich the flue gas flows, thereby increasing flue gas flow velocity to about 5 m/s to about 15 m/s. Likewise, such arrangement of the angled single and double plates affects flue gas flow for increased flue gas flow into direct contact with the absorption liquid spray for increased sulphur dioxide absorption efficiency and for increased particulate matter capture efficiency by the absorption liquid. With flue gas flow velocities less than 5 m/s, absorption liquid and flue gas intermixing tends to be less efficient. Also, with flue gas flow velocities less than 5 m/s, shear force between the particulate matter in the flue gas impacting the absorption liquid droplets is relatively low thus reducing the particulate matter capture rate. Increasing flue gas flow velocity to about 5 m/s to about 15 m/s increases shear force impact between the particulate matter in the flue gas and the absorption liquid droplets thus increasing the particulate matter capture rate. With flue gas velocities greater than about 15 m/s, the flue gas pressure drop within the wet scrubber tower tends to increase to unacceptably high levels. Such high pressure drop levels are unacceptable due to the relatively large amount of energy required to pass flue gas through and out of the wet scrubber tower. Also, with flue gas velocities greater than about 15 m/s, a relatively large portion of the atomized absorption liquid becomes entrained within the flue gas, causing increased liquid loads on the wet scrubber tower mist eliminator, potentially causing an increased loss of absorption liquid from the wet scrubber.

According to the subject system embodiments and methods, open areas between adjacent double plates arranged at common or varying angles within a common horizontal plane within the wet scrubber tower below that of the upwardly spraying nozzles, increases upward flow velocity of flue gas through the open areas to a velocity of about 5 m/s to about 15 m/s. Such arrangement of the double plates effectively reduces the cross-sectional area of the wet scrubber tower throughwhich the flue gas flows, thereby increasing flue gas flow velocity to about 5 m/s to about 15 m/s. Likewise, such arrangement of the angled double plates affects flue gas flow for increased flue gas flow into direct contact with the absorption liquid spray for increased sulphur dioxide absorption efficiency and for increased particulate matter capture efficiency by the absorption liquid. With flue gas flow velocities less than 5 m/s, absorption liquid and flue gas intermixing tends to be less efficient. Also, with flue gas flow velocities less than 5 m/s, shear force between the particulate matter in the flue gas impacting the absorption liquid droplets is relatively low thus reducing the particulate matter capture rate. Increasing flue gas flow velocity to about 5 m/s to about 15 m/s increases shear force impact between the particulate matter in the flue gas and the absorption liquid droplets thus increasing the particulate matter capture rate. With flue gas velocities greater than about 15 m/s, the flue gas pressure drop within the wet scrubber tower tends to increase to unacceptably high levels. Such high pressure drop levels are unacceptable due to the relatively large amount of energy required to pass flue gas through and out of the wet scrubber tower. Also, with flue gas velocities greater than about 15 m/s, a relatively large portion of the atomized absorption liquid becomes entrained within the flue gas, causing increased liquid loads on the wet scrubber tower mist eliminator, potentially causing an increased loss of absorption liquid from the wet scrubber.

According to the subject system embodiments and methods, open areas between adjacent double plates arranged at common or varying angles within a common horizontal plane within the wet scrubber tower below that of the upwardly spraying nozzles, and open areas between adjacent double plates arranged at common or varying angles within a common horizontal plane within the wet scrubber tower above that of the downwardly spraying nozzles, increases upward flow velocity of flue gas through the open areas to a velocity of about 5 m/s to about 15 m/s. Such arrangement of the double plates effectively reduces the cross-sectional area of the wet scrubber tower throughwhich the flue gas flows, thereby increasing flue gas flow velocity to about 5 m/s to about 15 m/s. Likewise, such arrangement of the angled double plates affects flue gas flow for increased flue gas flow into direct contact with the absorption liquid spray for increased sulphur dioxide absorption efficiency and for increased particulate matter capture efficiency by the absorption liquid. With flue gas flow velocities less than 5 m/s, absorption liquid and flue gas intermixing tends to be less efficient. Also, with flue gas flow velocities less than 5 m/s, shear force between the particulate matter in the flue gas impacting the absorption liquid droplets is relatively low thus reducing the particulate matter capture rate. Increasing flue gas flow velocity to about 5 m/s to about 15 m/s increases shear force impact between the particulate matter in the flue gas and the absorption liquid droplets thus increasing the particulate matter capture rate. With flue gas velocities greater than about 15 m/s, the flue gas pressure drop within the wet scrubber tower tends to increase to unacceptably high levels. Such high pressure drop levels are unacceptable due to the relatively large amount of energy required to pass flue gas through and out of the wet scrubber tower. Also, with flue gas velocities greater than about 15 m/s, a relatively large portion of the atomized absorption liquid becomes entrained within the flue gas, causing increased liquid loads on the wet scrubber tower mist eliminator, potentially causing an increased loss of absorption liquid from the wet scrubber.

An advantage of the subject system embodiments and methods is that the single and/or double plates efficiently increase flue gas flow directly through areas of atomized absorption liquid sprayed from upwardly and/or downwardly spraying nozzles, thereby decreasing flue gas flow through areas between atomized absorption liquid spray, for more efficient intermixing of absorption liquid and flue gas.

In summary, the subject WFGD system comprises a wet scrubber tower, an at least first spray level arrangement equipped with a plurality of nozzles, arranged within the wet scrubber tower above a flue gas inlet, and a plurality of plates arranged between the plurality of nozzles of the at least first spray level arrangement directing flue gas to flow from the flue gas inlet into an absorbent liquid dispersed by the plurality of nozzles to reduce flue gas sulphur oxides and particulate matter. As such, the plurality of nozzles of the at least first spray level arrangement spray absorbent liquid downwardly, upwardly and/or downwardly and upwardly.

According to the system, the plurality of plates comprises single plates arranged in pairs, with each of the single plates arranged with an upstream edge relatively distanced one from another and a downstream edge in relatively close proximity one to another. Further, the plurality of plates comprises single plates arranged in pairs, with a first single plate of a pair having a positive angle of about 0 degrees to about 60 degrees with respect to horizontal, or about 15 degrees to about 40 degrees with respect to horizontal, and a second single plate of the pair having a negative angle of about 0 degrees to about 60 degrees with respect to horizontal, or about 15 degrees to about 40 degrees with respect to horizontal. Further, the plurality of plates comprises double plates arranged with a first portion having a positive angle of about 0 degrees to about 60 degrees with respect to horizontal, or about 15 degrees to about 40 degrees with respect to horizontal, and a first upstream edge relatively distanced from a second upstream edge of a second portion having a negative angle of about 0 degrees to about 60 degrees with respect to horizontal, or about 15 degrees to about 40 degrees with respect to horizontal, with the first portion and the second portion joined at a downstream apex. Also, the plurality of plates comprises double plates arranged with a first portion having a positive angle of about 0 degrees to about 60 degrees with respect to horizontal, or about 15 degrees to about 40 degrees with respect to horizontal, and a first downstream edge relatively distanced from a second downstream edge of a second portion having a negative angle of about 0 degrees to about 60 degrees with respect to horizontal, or about 15 degrees to about 40 degrees with respect to horizontal, with the first portion and the second portion joined at an upstream apex. Still further, the plurality of plates comprises single plates arranged in pairs, with a first single plate of a pair having a positive angle of about 0 degrees to about 60 degrees with respect to horizontal, or about 15 degrees to about 40 degrees with respect to horizontal, and a second single plate of the pair having a negative angle of about 0 degrees to about 60 degrees with respect to horizontal, or about 15 degrees to about 40 degrees with respect to horizontal, and double plates arranged downstream of each pair of single plates with the double plates arranged with a first portion having a positive angle of about 0 degrees to about 60 degrees with respect to horizontal, or about 15 degrees to about 40 degrees with respect to horizontal, and a first downstream edge relatively distanced from a second downstream edge of a second portion having a negative angle of about 0 degrees to about 60 degrees with respect to horizontal, or about 15 degrees to about 40 degrees with respect to horizontal, with the first portion and the second portion joined at an upstream apex.

In summary, the subject method of wet flue gas desulphurisation of a flue gas comprising sulphur oxides comprises equipping a wet scrubber tower with an at least first spray level arrangement comprising a plurality of nozzles, above a flue gas inlet, and arranging a plurality of plates between the plurality of nozzles of the at least first spray level arrangement to direct flue gas flow from the flue gas inlet into an absorbent liquid dispersed by the plurality of nozzles to reduce flue gas sulphur oxides and particulate matter. According to the method, the plurality of nozzles of the at least first spray level arrangement spray absorbent liquid downwardly, upwardly and/or downwardly and upwardly. Also, according to the method, the plurality of plates comprises single plates arranged in pairs, with each of the single plates arranged with an upstream edge relatively distanced one from another and a downstream edge in relatively close proximity one to another. Further, the plurality of plates comprises single plates arranged in pairs, with a first single plate of a pair having a positive angle of about 0 degrees to about 60 degrees with respect to horizontal, or about 15 degrees to about 40 degrees with respect to horizontal, and a second single plate of the pair having a negative angle of about 0 degrees to about 60 degrees with respect to horizontal, or about 15 degrees to about 40 degrees with respect to horizontal. Further, the plurality of plates comprises double plates arranged with a first portion having a positive angle of about 0 degrees to about 60 degrees with respect to horizontal, or about 15 degrees to about 40 degrees with respect to horizontal, and a first upstream edge relatively distanced from a second upstream edge of a second portion having a negative angle of about 0 degrees to about 60 degrees with respect to horizontal, or about 15 degrees to about 40 degrees with respect to horizontal, with the first portion and the second portion joined at a downstream apex. Still further according to the subject method, the plurality of plates comprises double plates arranged with a first portion having a positive angle of about 0 degrees to about 60 degrees with respect to horizontal, or about 15 degrees to about 40 degrees with respect to horizontal, and a first downstream edge relatively distanced from a second downstream edge of a second portion having a negative angle of about 0 degrees to about 60 degrees with respect to horizontal, or about 15 degrees to about 40 degrees with respect to horizontal, with the first portion and the second portion joined at an upstream apex.

BRIEF DESCRIPTION OF THE DRAWINGS

The subject disclosure is described in more detail below with reference to the appended drawings in which.

DESCRIPTION

Figure 1:
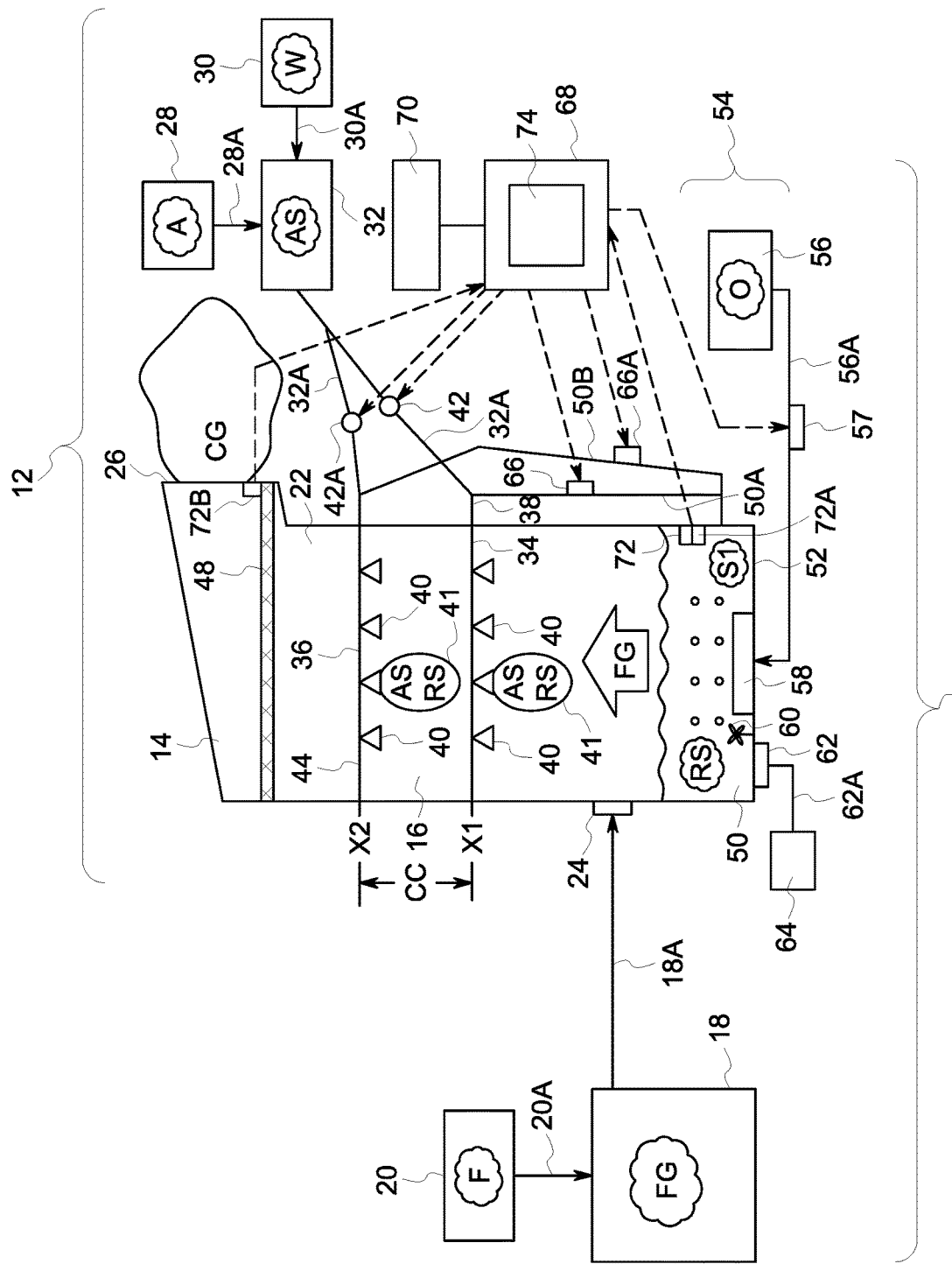
FIG. 1 is a schematic side cross-sectional view of a plant equipped with a wet flue gas desulphurisation (WFGD) system in accordance with the subject disclosure.

FIG. 1 illustrates a plant 10 with a wet flue gas desulphurisation (WFGD) system 12 comprising a wet scrubber 14. The wet scrubber 14 comprises a wet scrubber tower 16 operative for removing at least a portion of a sulphur oxide ($SO_x$) and/or particulate matter content of a flue gas FG generated in a combustion unit 18 operative for combusting a fuel F, such as coal, oil, peat, waste and the like. Fuel F from a fuel supply 20 is supplied to combustion unit 18 via duct 20A. Fuel F is combusted within combustion unit 18, which generates flue gas FG comprising environmental pollutants, such as sulphur oxides and particulate matter. Generated flue gas FG flows from combustion unit 18 to WFGD system 12 via duct 18A. The wet scrubber 14 of WFGD system 12 comprises a vertical open wet scrubber tower 16 with an interior area 22, and a flue gas inlet 24 fluidly connected to duct 18A for flue gas FG flow through interior area 22 and out of the wet scrubber tower 16 through flue gas outlet 26 as cleaned flue gas CG. Cleaned flue gas CG flowing out from flue gas outlet 26 is flue gas FG from which at least a portion of the sulphur oxide and/or particulate matter content has been removed.

To remove at least a portion of the sulphur oxide and/or particulate matter content of the flue gas FG flowing into interior area 22, an absorbent A, such as limestone or lime, from an absorbent supply 28 and a liquid W, such as water, from a liquid supply 30 are supplied via ducts 28A and 30A, respectively, to a slurry tank 32. Within slurry tank 32 the absorbent A and the liquid W are mixed to produce an alkaline absorbent liquid/slurry AS. The produced alkaline absorbent liquid/slurry AS is supplied from slurry tank 32 via fluidly connected duct 32A and one or more valves 42, 42A to interior area 22 for atomisation therein, as described in more detail below.

Wet scrubber tower 16 further comprises an at least first spray level arrangement 34 arranged horizontally across interior area 22 above flue gas inlet 24. However, depending on specific operating parameters of the WFGD system 12, one to ten, or more typically three to six, identical or differing spray level arrangements in accordance with the subject disclosure may be installed within wet scrubber tower 16. If more than one spray level arrangement 34 is required in WFGD system 12 due to specific operating parameters of the WFGD system 12, there is a distance CC between spray level arrangements 34, 36 as illustrated in FIG. 1. Distance CC is determined by measuring from a mid-point X1 of one spray level arrangement, e.g., the first spray level arrangement 34, to a mid-point X2 of an adjacent spray level system, e.g., the second spray level arrangement 36. Distance CC is preferably about 0.3 m to about 3 m. If more than two spray level arrangements 34, 36 are arranged within wet scrubber tower 16, distance CC between the various spray level arrangements may be the same or different. A distance CC less than about 0.3 m is less preferable, due to unwanted absorbent liquid/slurry AS spray interference between adjacent spray level arrangements 34, 36, resulting in decreased sulphur oxide and/or particulate matter removal efficiency. A distance CC more than about 3 m is less preferable, since greater distances CC require increases in the overall height of wet scrubber tower 16, thus increasing capital investment and operating costs. It will be appreciated that wet scrubber tower 16 may comprise one to ten spray level arrangements, although only an at least first spray level arrangement 34 is exemplified in most instances below for purposes of clarity and simplicity, not limitation.

An at least first spray level arrangement 34 comprises a tubular portion 38 equipped with a plurality of fluidly connected atomizing nozzles 40 to distribute via spray/atomisation alkaline absorbent liquid/slurry AS supplied thereto from slurry tank 32. Alkaline absorbent liquid/slurry AS is supplied to tubular portion 38 via fluidly connected valve 42, duct 32A, and slurry tank 32. Alkaline absorbent liquid/slurry AS is distributed within interior area 22 by nozzles 40 for intermixing contact between the alkaline absorbent liquid/slurry AS and the flue gas FG flowing upwardly through interior area 22 of wet scrubber tower 16. All or some of nozzles 40 may the same, such as for example Model 22298-2CF-SILCNB75-120, available from Spraying Systems Co, Wheaton, Ill., USA. This type of atomizing nozzle is operative for a liquid flow of about 17 m³/hour, corresponding to 17000 litres/hour, or 280 litres/minute, at a spraying pressure measured using water, of about 0.5 bar.

A mist eliminator 48 is arranged horizontally across interior area 22 above the at least first spray level arrangement 34 and adjacent to flue gas outlet 26. Mist eliminator 48 removes at least a portion of the alkaline absorbent liquid/slurry AS droplets entrained in the cleaned flue gas CG. Hence, any entrained alkaline absorbent liquid/slurry AS droplets are removed from the produced cleaned flue gas CG as the cleaned flue gas CG flows upwardly through mist eliminator 48 prior to exiting wet scrubber tower 16 via flue gas outlet 26.

Alkaline absorbent liquid/slurry AS distributed within interior area 22 flows downwardly within interior area 22 intermixing and reacting with sulphur oxides and/or capturing particulate matter in the upwardly flowing flue gas FG to produce cleaned flue gas CG of a reduced sulphur oxide and/or particulate matter content as compared to combustion unit 18 produced flue gas FG, and to produce at least partially reacted slurry RS. More specifically, sulphur oxides in the flue gas FG react with the absorbent A in the alkaline absorbent liquid/slurry AS to produce an at least partially reacted slurry RS comprising calcium sulphite, $CaSO_3$. Likewise, flue gas FG particulate matter is captured in the alkaline absorbent liquid/slurry AS upon impact therewith for removal of the particulate matter from the flue gas FG. The produced at least partially reacted slurry RS is received in tank 50 arranged in a bottom 52 of interior area 22 of wet scrubber tower 16. Tank 50 is equipped with a fluidly connected oxidation system 54 for oxidation of the at least partially reacted slurry RS calcium sulphite to produce gypsum, $CaSO_4$. Oxidation system 54 achieves oxidation of at least partially reacted slurry RS calcium sulphite by supplying an oxygen-containing gas O to the tank 50 for distribution through the at least partially reacted slurry RS collected in tank 50. As such, oxidation system 54 comprises an oxygen-containing gas supply 56, such as for example a blower, fluidly connected via duct 56A to gas inlet 58 of tank 50. Optionally, oxidation system 54 may include an agitator 60 for mixing the at least partially reacted slurry RS within the tank 50 for more efficient oxidation of the calcium sulphite with the oxygen-containing gas O supplied to the tank 50 and distributed throughout the at least partially reacted slurry RS. Gypsum produced by the oxidation of the calcium sulphite is removed from the wet scrubber tower 16 via an outlet 62 fluidly connected disposal pipe 62A to a fluidly connected gypsum dewatering unit 64. The dewatered gypsum may be used commercially, for example in wallboard production for the construction industry.

Illustrated in FIG. 1, tank 50 is fluidly connected to tubular portion 38 of the at least first spray level arrangement 34 via duct 50A. As such, at least partially reacted slurry RS may be circulated by pump 66 to the at least first spray level arrangement 34, tubular portion 38, and atomizing nozzles 40, via duct 50A. Likewise, at least partially reacted slurry RS may be circulated by pump 66A to the second spray level arrangement 36, tubular portion 44, and atomizing nozzles 40, via duct 50B. As such, at least partially reacted slurry RS may be circulated to the at least first spray level arrangement 34 and/or the second spray level arrangement 36, in addition to or instead of alkaline absorbent liquid/slurry AS from slurry tank 32 via duct 32A and valves 42, 42A. As an option, slurry tank 32 may be fluidly connected to tank 50 (not shown) for supply of alkaline absorbent liquid/slurry AS from slurry tank 32 directly to tank 50.

During operation of the WFGD system 12 with oxidation system 54, a controller 68 of the WFGD system 12 is used to control desulphurisation efficiency and oxidation of the sulfites in the at least partially reacted slurry RS collected in the tank 50 by affecting adjustment of a valve 57 from open to closed positions, or to a position therebetween. Valve 57 is used to control the flow rate of oxygen-containing gas O supplied to the at least partially reacted slurry RS collected in the tank 50. As such, a predetermined sulfite concentration is received in the controller 68, for example, via an interface 70. One or more sulfite sensors 72 in contact with the at least partially reacted slurry RS measure a sulfite concentration $S_1$ in the at least partially reacted slurry RS collected in the tank 50 to obtain a sulfite concentration measurement. Software 74 executing on the controller 68 generates an electronic signal affecting an adjustment of the valve 57 thereby adjusting flow rate of the oxygen-containing gas O from oxygen-containing gas supply 56 through duct 56A to gas inlet 58 of tank 50 for supply to the at least partially reacted slurry RS collected in the tank 50. This adjustment of valve 57 is based at least in part on the sulfite concentration $S_1$/sulfite concentration measurement. For example, if the sulfite concentration $S_1$/sulfite concentration measurement is greater than the predetermined sulfite concentration, software 74 executing on the controller 68 generates an electronic signal to affect adjustment of the valve 57 to a more open position, thus providing more oxygen-containing gas O to the at least partially reacted slurry RS and increasing the oxidation level thereof. Conversely, if the sulfite concentration $S_1$/sulfite concentration measurement is less than the predetermined sulfite concentration, software 74 executing on the controller 68 generates an electronic signal to affect adjustment of the valve 57 to a more closed position, thus providing less oxygen-containing gas O to the at least partially reacted slurry RS and decreasing the oxidation level thereof. To the extent that the predetermined sulfite concentration is equivalent to the sulfite concentration $S_1$/sulfite concentration measurement, software 74 executing on the controller 68 will generate no electronic signal. Hence, with no electronic signal, the valve 57 is not adjusted thereby maintaining the flow of oxygen-containing gas O to the at least partially reacted slurry RS constant so as to continue the current oxidation level thereof. As described, the disclosed WFGD system 12 and method of using the same can control the oxidation of the sulfites in the at least partially reacted slurry RS collected in the tank 50.

Likewise, during operation of the WFGD system 12, the controller 68 of the WFGD system 12 may control the sulfite concentration $S_1$/sulfite concentration measurement in the at least partially reacted slurry RS collected in the tank 50 by affecting adjustment of one or more of the valves 42, 42A from open to closed positions, or to positions therebetween, and affecting adjustment of pumps 66, 66A as needed, to control the supply of alkaline absorbent slurry AS and/or the at least partially reacted slurry RS to the at least first spray level arrangement 34 and/or second spray level arrangement 36. As disclosed above, a predetermined sulfite concentration is received in the controller 68, for example, via the interface 70. The one or more sulfite sensors 72 in contact with the at least partially reacted slurry RS measure a sulfite concentration $S_1$ of the at least partially reacted slurry RS collected in the tank 50 to obtain a sulfite concentration measurement. Software 74 executing on the controller 68 generates an electronic signal affecting adjustment of one or more of the valves 42, 42A, and affecting adjustment of one or more of the pumps 66, 66A as needed, thereby adjusting the supply rate and/or the supply ratio of alkaline absorbent slurry AS and/or at least partially reacted slurry RS to the at least first spray level arrangement 34 and/or the second spray level arrangement 36. This adjustment in the supply rate and/or the supply ratio of alkaline absorbent liquid/slurry AS and/or the at least partially reacted slurry RS is based at least in part on the sulfite sensor 72 obtained sulfite concentration measurement of the sulfite concentration $S_1$ of the at least partially reacted slurry RS in tank 50. For example, if the sulfite concentration $S_1$/sulfite concentration measurement is greater than the predetermined sulfite concentration, software 74 executing on the controller 68 generates an electronic signal to affect adjustment of one or more of the valves 42, 42A to a more closed position with respect to the supply of alkaline absorbent liquid/slurry AS, to affect adjustment of one or more of the pumps 66, 66A to reduce the supply of at least partially reacted slurry RS, or both, thus supplying less alkaline absorbent liquid/slurry AS and/or at least partially reacted slurry RS to the at least first spray level arrangement 34 and/or second spray level arrangement 36, thereby decreasing the sulfite concentration $S_1$ thereof. Conversely, if the sulfite concentration $S_1$/sulfite concentration measurement is less than the predetermined sulfite concentration, software 74 executing on the controller 68 generates an electronic signal to affect adjustment of one or more of the valves 42, 42A to a more open position with respect to the supply of alkaline absorbent liquid/slurry AS, to affect adjustment of one or more of the pumps 66, 66A to increase the supply of at least partially reacted slurry RS, or both, thus supplying more alkaline absorbent liquid/slurry AS and/or at least partially reacted slurry RS to the at least first spray level arrangement 34 and/or second spray level arrangement 36, thereby increasing the sulfite concentration $S_1$ thereof. To the extent that the predetermined sulfite concentration is equivalent to the sulfite concentration $S_1$/sulfite concentration measurement, software 74 executing on the controller 68 will generate no electronic signal. Hence, with no electronic signal, the valves 42, 42A are not adjusted and the pumps 66, 66A are not adjusted, thereby maintaining the supply rate and/or the supply ratio of the alkaline absorbent liquid/slurry AS and/or at least partially reacted slurry RS to the at least first spray level arrangement 34 and/or second spray level arrangement 36, and thereby the sulfite concentration $S_1$, constant. As described, the disclosed WFGD system 12 and method of using the same can control flue gas desulphurisation efficiency through measurement of the sulfite concentration $S_1$ of the at least partially reacted slurry RS collected in the tank 50.

As an alternative to controlling the desulphurisation efficiency of the disclosed WFGD system 12 and method of using the WFGD system 12 based at least in part on the sulfite concentration $S_1$ of the at least partially reacted slurry RS collected in the tank 50, is controlling the desulphurisation efficiency of the disclosed WFGD system 12 and method of using the WFGD system 12 based on sulphur oxide level(s) of flue gas FG at flue gas outlet 26 through control of the pH of the at least partially reacted slurry RS. Such control of the pH of the at least partially reacted slurry RS is achieved by controlling the supply of fresh alkaline absorbent liquid/slurry AS through valves 42, 42A. Accordingly, during operation of the WFGD system 12, the controller 68 of the WFGD system 12 may control the pH of the at least partially reacted slurry RS collected in the tank 50 by affecting adjustment of one or more of the valves 42, 42A from open to closed positions, or to positions therebetween, to control the supply of alkaline absorbent slurry AS to the at least first spray level arrangement 34 and/or second spray level arrangement 36. As such, a predetermined pH is received in the controller 68, for example, via the interface 70. One or more pH sensors 72A in contact with the at least partially reacted slurry RS measure pH of the at least partially reacted slurry RS collected in the tank 50 to obtain a pH measurement. Software 74 executing on the controller 68 generates an electronic signal affecting adjustment of one or more of the valves 42, 42A, thereby adjusting the supply rate of alkaline absorbent slurry AS to the at least first spray level arrangement 34 and/or second spray level arrangement 36. This adjustment in the supply rate of alkaline absorbent liquid/slurry AS is based at least in part on the pH sensor 72A obtained pH measurement of the at least partially reacted slurry RS in tank 50. For example, if the pH measurement is greater than the predetermined pH, software 74 executing on the controller 68 generates an electronic signal to affect adjustment of one or more of the valves 42, 42A to a more closed position with respect to the supply of alkaline absorbent liquid/slurry AS, thus supplying less alkaline absorbent liquid/slurry AS to the at least first spray level arrangement 34 and/or the second spray level arrangement 36, thereby decreasing the pH thereof. Conversely, if the pH measurement is less than the predetermined pH, software 74 executing on the controller 68 generates an electronic signal to affect adjustment of one or more of the valves 42, 42A to a more open position with respect to the supply of alkaline absorbent liquid/slurry AS, thus supplying more absorbent liquid/slurry AS to the at least first spray level arrangement 34 and/or second spray level arrangement 36, thereby increasing the pH thereof. To the extent that the pH is equivalent to the pH measurement, software 74 executing on the controller 68 will generate no electronic signal. Hence, with no electronic signal, the valves 42, 42A are not adjusted thereby maintaining the supply rate of the alkaline absorbent liquid/slurry AS to the at least first spray level arrangement 34 and/or second spray level arrangement 36, and thereby the pH, constant. As described, the disclosed WFGD system 12 and method of using the WFGD system 12 can control flue gas desulphurisation efficiency through measurement of the pH of the at least partially reacted slurry RS collected in the tank 50.

As an alternative to controlling the desulphurisation efficiency of the disclosed WFGD system 12 and method of using the WFGD system 12 based at least in part on the sulfite concentration $S_1$ of the at least partially reacted slurry RS collected in the tank 50, is controlling the desulphurisation and/or the particulate matter removal efficiency of the disclosed WFGD system 12 and method of using the WFGD system 12 based on sulphur oxide and/or particulate matter measurement(s) of flue gas FG at flue gas outlet 26 through control of the at least partially reacted slurry RS recirculation rate via pumps 66, 66A and/or the number of spray level arrangements 34, 36 in operation. Accordingly, during operation of the WFGD system 12, the controller 68 of the WFGD system 12 may control desulphurisation efficiency of the disclosed WFGD system 12 and method of using the WFGD system 12 based on the sulphur oxide and/or particulate matter measurement(s) of the cleaned flue gas CG at flue gas outlet 26 through control of the at least partially reacted slurry RS recirculation rate via pumps 66, 66A and/or the number of spray level arrangements 34, 36 in operation. As such, predetermined sulphur oxide and/or particulate matter level(s) of cleaned flue gas CG at flue gas outlet 26 is received in the controller 68, for example, via the interface 70. The one or more sulphur oxide and/or particulate matter sensors 72B at flue gas outlet 26 in contact with the cleaned flue gas CG flowing through the flue gas outlet 26 measure sulphur oxide and/or particulate matter levels to obtain sulphur oxide and/or particulate matter measurement(s) of the cleaned flue gas CG at flue gas outlet 26. Software 74 executing on the controller 68 generates an electronic signal affecting adjustment of one or more of the pumps 66, 66A and/or affecting adjustment of one or more of the valves 42, 42A, thereby adjusting the supply rate and/or the supply ratio of alkaline absorbent liquid/slurry AS and/or at least partially reacted slurry RS to the at least first spray level arrangement 34, to the second spray level arrangement 36, and/or adjusting the number of spray level arrangements 34, 36 in operation. This adjustment in the supply rate and/or the supply ratio of absorbent liquid/slurry AS and/or the at least partially reacted slurry RS, and/or the number of spray level arrangements 34, 36 in operation, is based at least in part on the one or more sulphur oxide and/or particulate matter sensors 72B obtained sulphur oxide and/or particulate matter measurement(s) of the cleaned flue gas CG at flue gas outlet 26. For example, if the sulphur oxide and/or particulate matter measurement(s) are greater than the predetermined sulphur oxide and/or particulate matter level(s), software 74 executing on the controller 68 generates an electronic signal to affect adjustment of one or more of the the pumps 66, 66A and/or to affect adjustment of one or more of the valves 42, 42A to a more open position with respect to the supply of alkaline absorbent liquid/slurry AS, the supply of at least partially reacted slurry RS, or both, thus supplying more alkaline absorbent liquid/slurry AS and/or at least partially reacted slurry RS to the at least first spray level arrangement 34 and/or the second spray level arrangement 36, thereby decreasing the sulphur oxide and/or particulate matter in the cleaned flue gas CG at flue gas outlet 26. Likewise, software 74 executing on the controller 68 may generate as an alternative to or in addition to the electronic signal to affect adjustment of the one or more pumps 66, 66A and/or to affect adjustment of the one or more valves 42, 42A, to increase the number of spray level arrangements 34, 36 in operation, thereby decreasing the sulphur oxide and/or particulate matter in the cleaned flue gas CG at flue gas outlet 26. Conversely, if the sulphur oxide and/or particulate matter measurement(s) are less than the predetermined sulfite concentration, software 74 executing on the controller 68 generates an electronic signal to affect adjustment of one or more of the pumps 66, 66A and/or to affect adjustment of the one or more valves 42, 42A to a more closed position with respect to the supply of alkaline absorbent liquid/slurry AS, the supply of at least partially reacted slurry RS, or both, thus supplying less alkaline absorbent liquid/slurry AS and/or at least partially reacted slurry RS to the at least first spray level arrangement 34 and/or the second spray level arrangement 36, thereby increasing the sulphur oxide and/or particulate matter in the cleaned flue gas CG at flue gas outlet 26. Likewise, software 74 executing on the controller 68 may generate as an alternative to or in addition to the electronic signal to affect adjustment of the one or more pumps 66, 66A and/or to affect adjustment of the one or more valves 42, 42A, to decrease the number of spray level arrangements 34, 36 in operation, thereby increasing the sulphur oxide and/or particulate matter in the cleaned flue gas CG at flue gas outlet 26. To the extent that the predetermined sulphur oxide and/or particulate matter level(s) are equivalent to the sulphur oxide and/or particulate matter measurement(s), software 74 executing on the controller 68 will generate no electronic signal. Hence, with no electronic signal, the one or more pumps 66, 66A and the one or more valves 42, 42A are not adjusted thereby maintaining the sulphur oxide and/or particulate matter in the cleaned flue gas CG at flue gas outlet 26, constant. As described, the disclosed WFGD system 12 and method of using the WFGD system 12 can control flue gas desulphurisation efficiency through measurement of the sulphur oxide and/or particulate matter in the cleaned flue gas CG at flue gas outlet 26.

Figure 2:
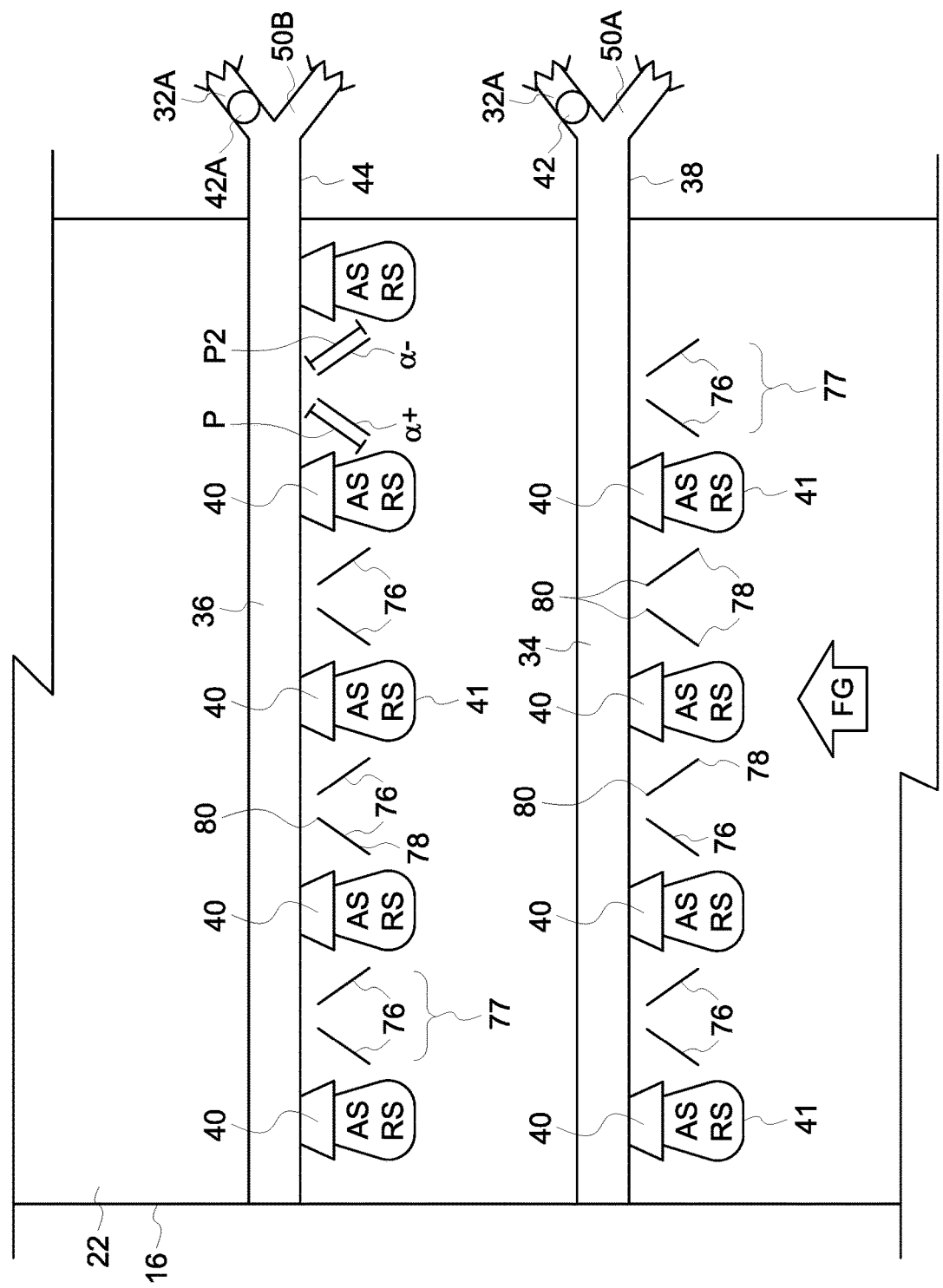
FIG. 2 is a schematic side cross-sectional view of a first embodiment of a wet scrubber of the WFGD system of FIG. 1.
Figure 3:
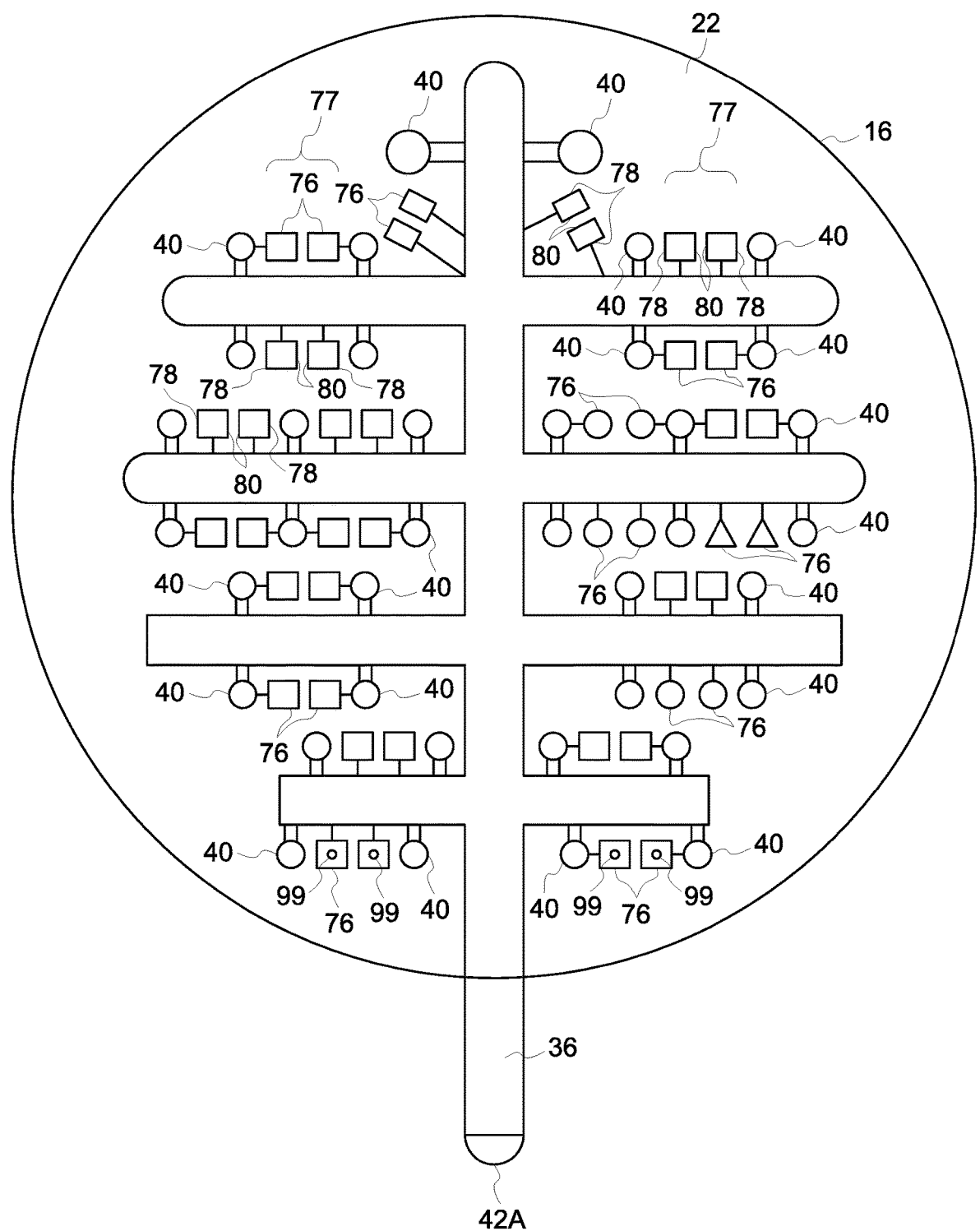
FIG. 3 is a schematic top cross-sectional view of the first embodiment of a wet scrubber of the WFGD system of FIG. 2.
Figure 15:
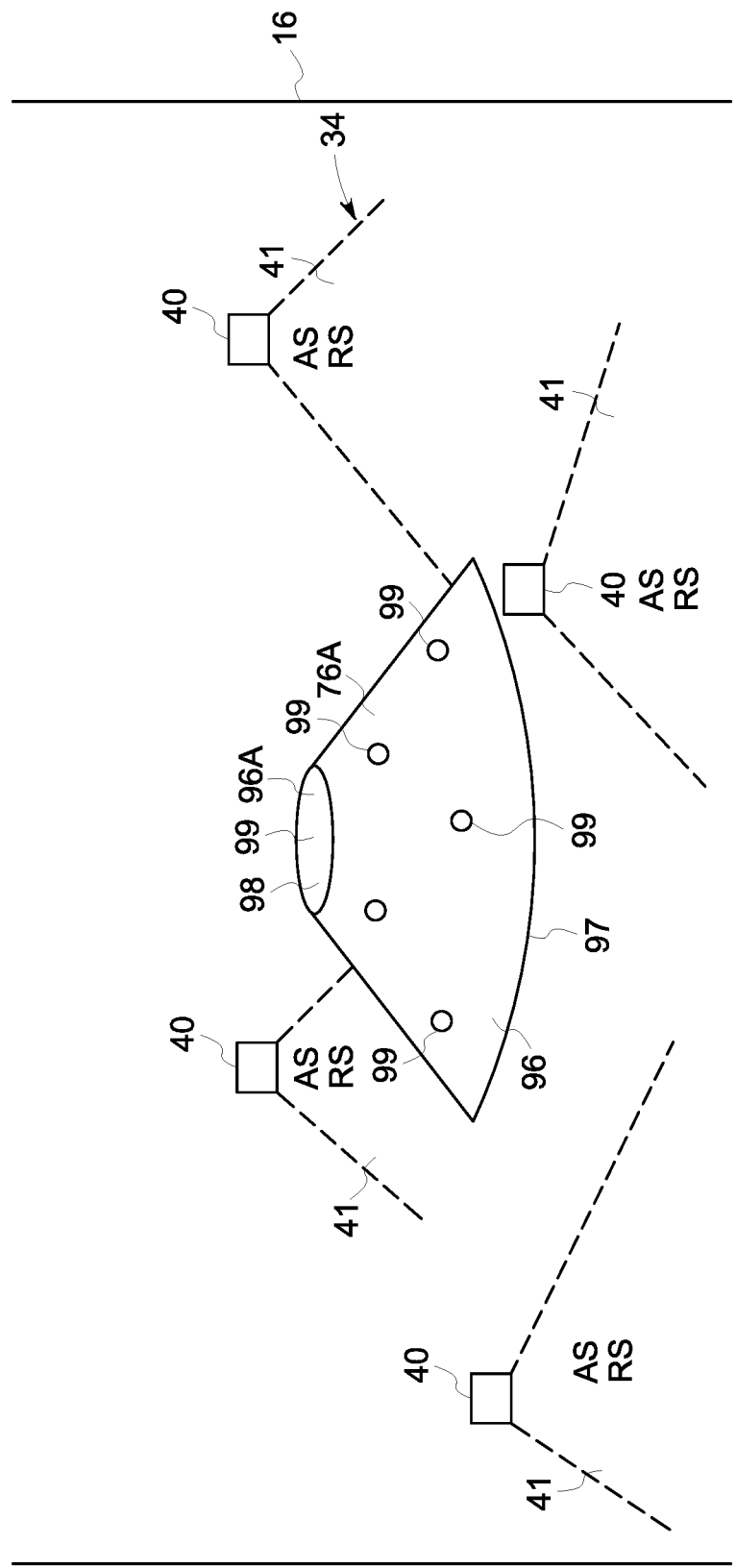
FIG. 15 is a schematic perspective cross-sectional view of another embodiment of a wet scrubber of the WFGD system of FIG. 1.

FIGS. 2 and 3 illustrate a first embodiment of the wet scrubber tower 16, in accordance with the subject disclosure. According to this first embodiment, wet scrubber tower 16 comprises within interior area 22 each an at least first spray level arrangement 34 and an optional second spray level arrangement 36 equipped with a plurality of downwardly spraying nozzles 40, and a plurality of single plates 76 arranged in pairs 77 between the downwardly spraying nozzles 40 outside of the nozzles' 40 spray zones 41. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single planar plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. Arrangement of pairs of single plates 76 within wet scrubber tower 16 increases flue gas FG flow velocity and increases flue gas FG contact with alkaline absorbent liquid/slurry AS/at least partially reacted slurry RS atomised within wet scrubber tower 16. The plurality of single plates 76 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 4:
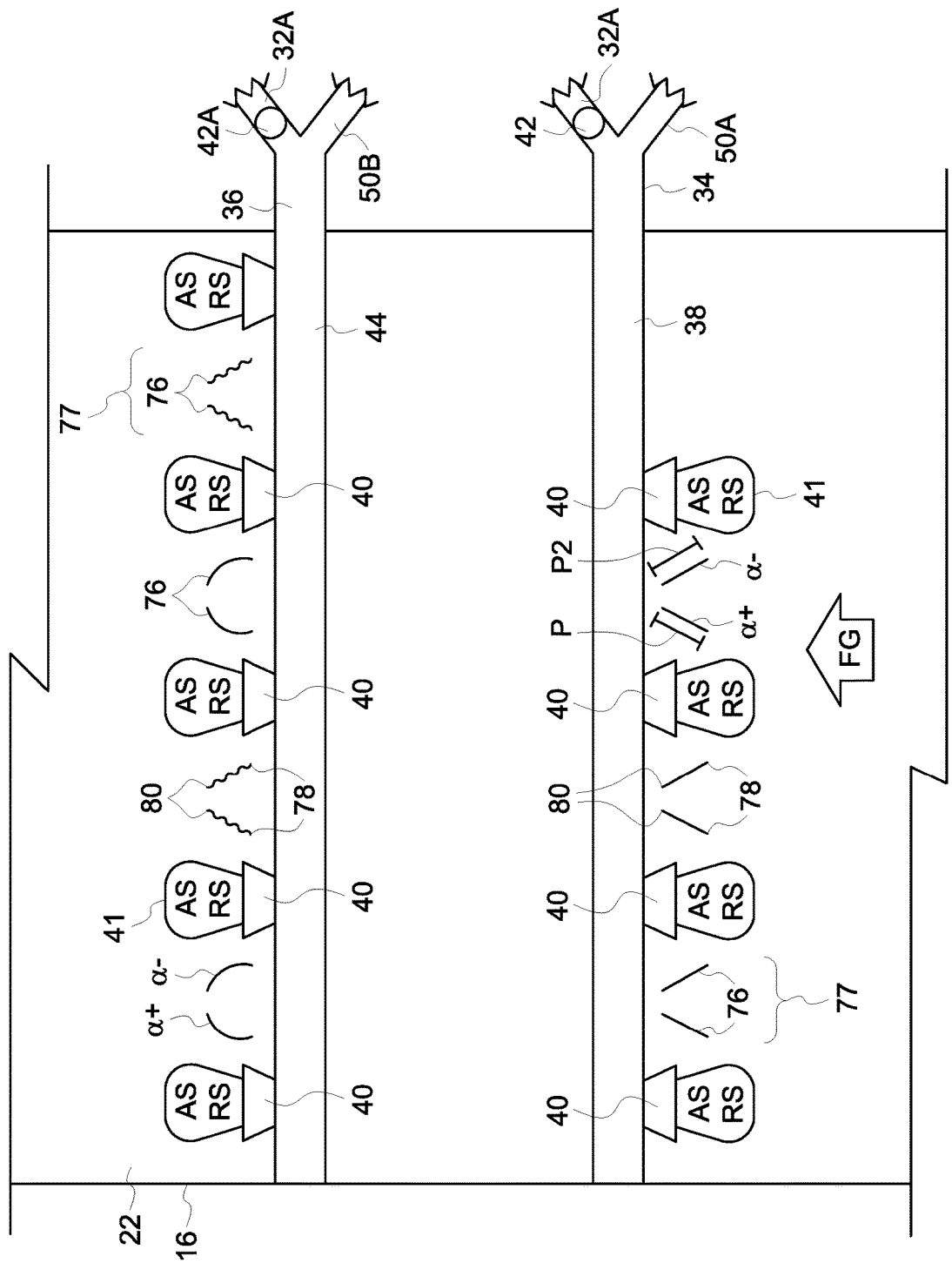
FIG. 4 is a schematic side cross-sectional view of another embodiment of a wet scrubber of the WFGD system of FIG. 1.

FIG. 4 illustrates another embodiment of the wet scrubber tower 16, in accordance with the subject disclosure. According to this embodiment, wet scrubber tower 16 comprises within interior area 22 an at least first spray level arrangement 34 equipped with a plurality of downwardly spraying nozzles 40, an optional second spray level arrangement 36 equipped with a plurality of upwardly spraying nozzles 40, and a plurality of single plates 76 arranged in pairs 77 between the downwardly spraying nozzles 40 outside of the nozzles' 40 spray zones 41 and arranged in pairs 77 between the upwardly spraying nozzles 40 outside of the nozzles' 40 spray zones 41. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single planar plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. Arrangement of pairs of single plates 76 within wet scrubber tower 16 increases flue gas FG flow velocity and increases flue gas FG contact with alkaline absorbent liquid/slurry AS/at least partially reacted slurry RS atomised within wet scrubber tower 16. The plurality of single plates 76 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 5:
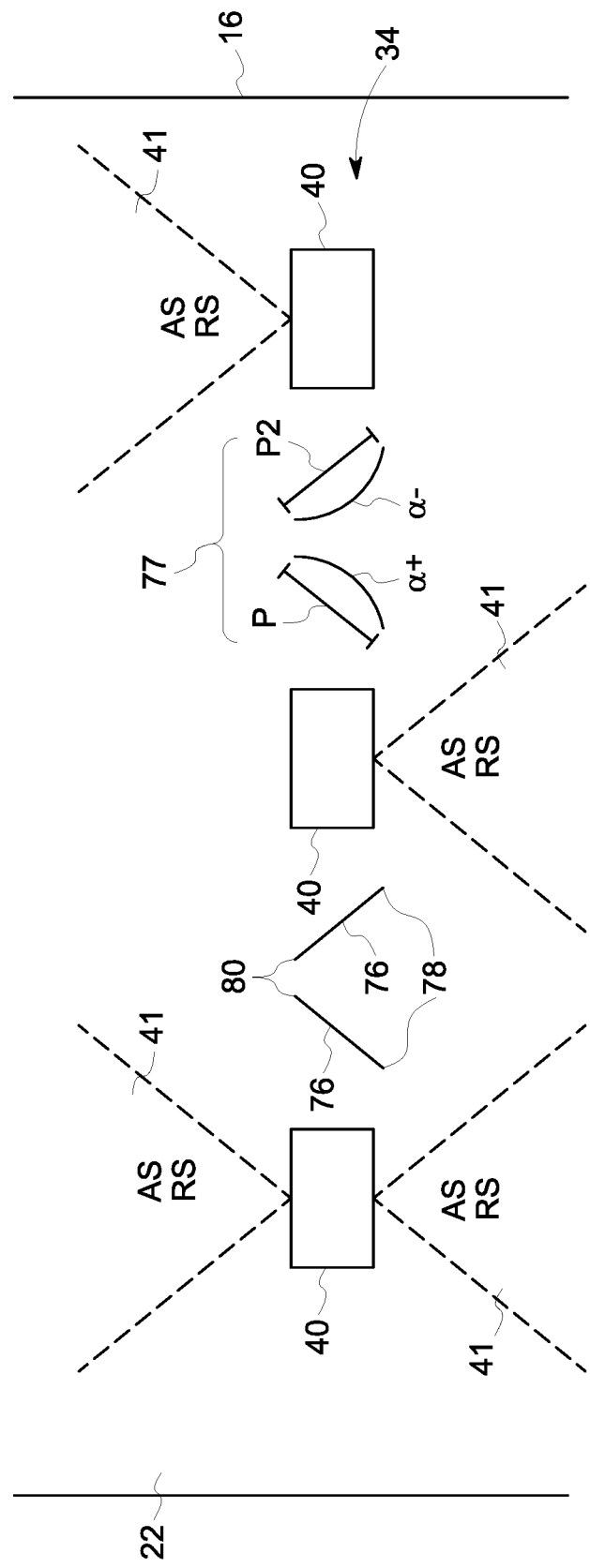
FIG. 5 is a schematic side cross-sectional view of another embodiment of a wet scrubber of the WFGD system of FIG. 1.

FIG. 5 is a schematic illustration of another embodiment of the wet scrubber tower 16, in accordance with the subject disclosure. According to this embodiment, wet scrubber tower 16 comprises within interior area 22 an at least a first spray level arrangement 34 equipped with a plurality of downwardly spraying, upwardly spraying and/or combination downwardly and upwardly spraying nozzles 40, and a plurality of single plates 76 arranged in pairs 77 between nozzles 40 outside of the nozzles' 40 spray zones 41. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. Arrangement of pairs of single plates 76 within wet scrubber tower 16 increases flue gas FG flow velocity and increases flue gas FG contact with alkaline absorbent liquid/slurry AS/at least partially reacted slurry RS atomised within wet scrubber tower 16. The plurality of single plates 76 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 6:
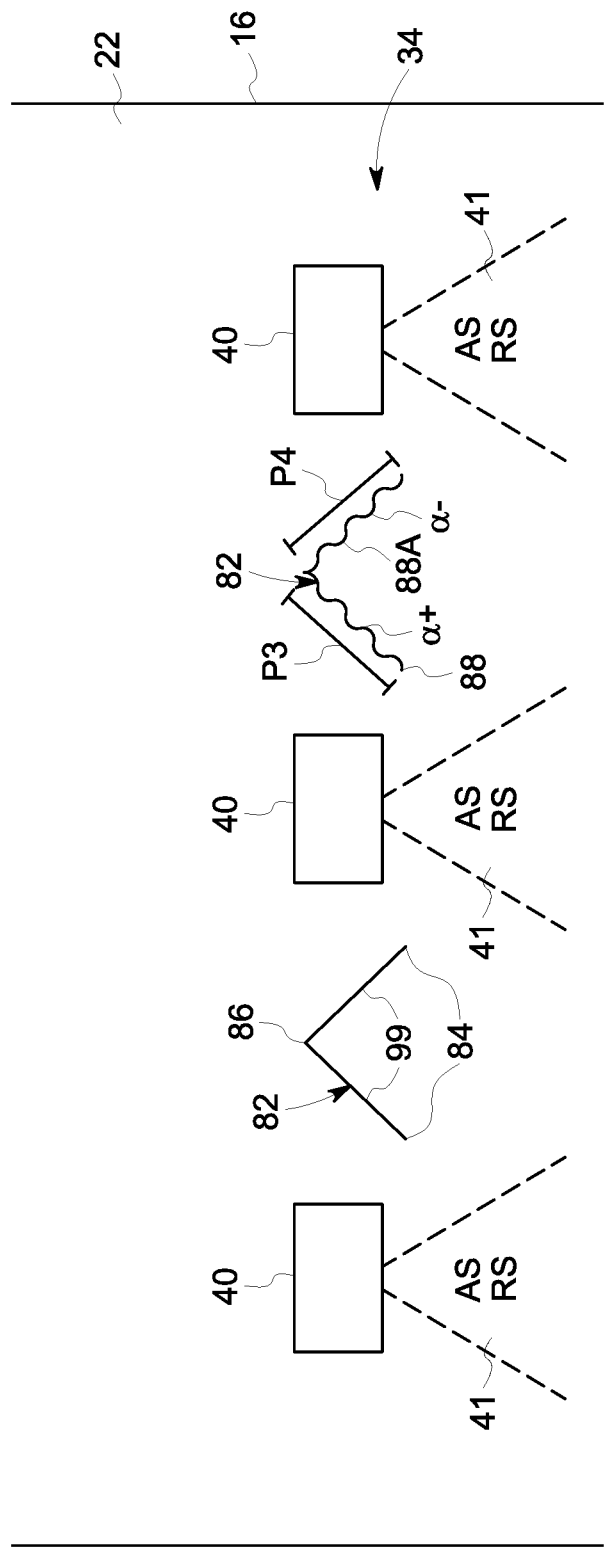
FIG. 6 is a schematic side cross-sectional view of another embodiment of a wet scrubber of the WFGD system of FIG. 1.

FIG. 6 is a schematic illustration of another embodiment of the wet scrubber tower 16, in accordance with the subject disclosure. According to this embodiment, wet scrubber tower 16 comprises within interior area 22 an at least first spray level arrangement 34 equipped with a plurality of downwardly spraying nozzles 40, and a plurality of double plates 82 arranged between the downwardly spraying nozzles 40 outside of the nozzles' 40 spray zones 41. Each of the double plates 82 is arranged with upstream edges 84 relatively distanced one from the other and a downstream apex 86. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, triangular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. Arrangement of double plates 82 within wet scrubber tower 16 increases flue gas FG flow velocity and increases flue gas FG contact with alkaline absorbent liquid/slurry AS/at least partially reacted slurry RS atomised within wet scrubber tower 16. The plurality of double plates 82 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 7:
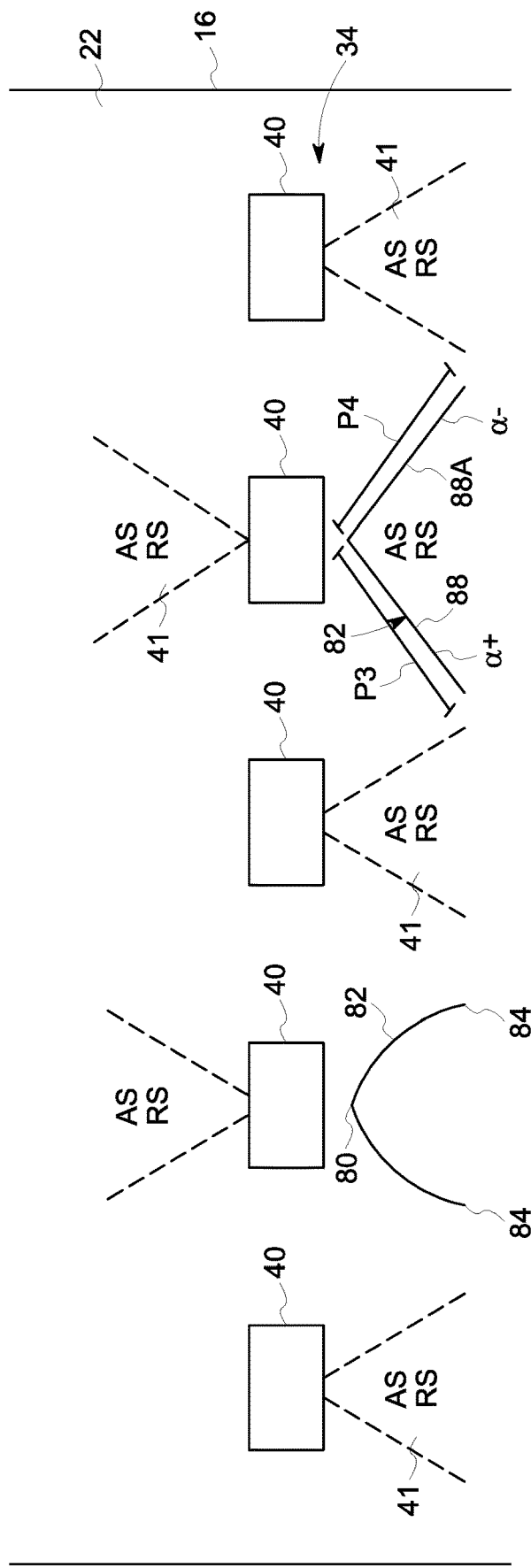
FIG. 7 is a schematic side cross-sectional view of another embodiment of a wet scrubber of the WFGD system of FIG. 1.

FIG. 7 is a schematic illustration of another embodiment of the wet scrubber tower 16, in accordance with the subject disclosure. According to this embodiment, wet scrubber tower 16 comprises within interior area 22 an at least first spray level arrangement 34 equipped with a plurality of downwardly spraying nozzles 40, a plurality of upwardly spraying nozzles 40, and a plurality of double plates 82 arranged between each of the downwardly spraying nozzles 40 outside of the nozzles' 40 spray zones 41 and just below each of the upwardly spraying nozzles 40 outside of the nozzles' 40 spray zones 41. Each of the double plates 82 is arranged with upstream edges 84 relatively distanced one from the other and a common downstream apex 86. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other geometric or non-geometric two-dimensional form to achieve desired flue gas FG flow within wet scrubber tower 16. Further, one or more double plates 82 may include one or more perforations 99 therethrough, such as illustrated in FIG. 15 with respect to single plate 76A. Arrangement of double plates 82 within wet scrubber tower 16 increases flue gas FG flow velocity and increases flue gas FG contact with alkaline absorbent liquid/slurry AS/at least partially reacted slurry RS atomised within wet scrubber tower 16. The plurality of double plates 82 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent/liquid slurry AS/at least partially reacted slurry RS yields very efficient absorption/capture of flue gas pollutants, such as sulphur oxides and/or particulate matter.

Figure 8:
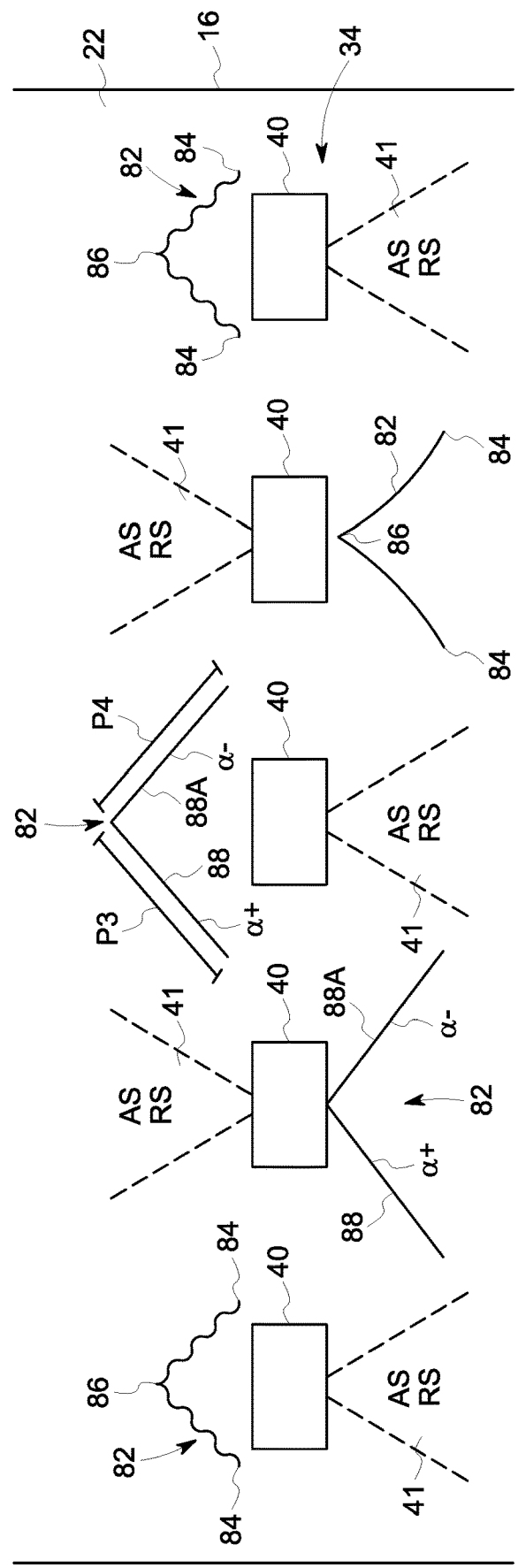
FIG. 8 is a schematic side cross-sectional view of another embodiment of a wet scrubber of the WFGD system of FIG. 1.

FIG. 8 is a schematic illustration of another embodiment of the wet scrubber tower 16, in accordance with the subject disclosure. According to this embodiment, wet scrubber tower 16 comprises within interior area 22 an at least first spray level arrangement 34 equipped with a plurality of downwardly spraying nozzles 40, a plurality of upwardly spraying nozzles 40, a plurality of double plates 82 arranged between each of the downwardly spraying nozzles 40 outside of the nozzles' 40 spray zones 41 and just below the upwardly spraying nozzles 40 outside of the nozzles' 40 spray zones 41, and a plurality of double plates 82 arranged between each of the upwardly spraying nozzles 40 outside of the nozzles' 40 spray zones 41 and just above the downwardly spraying nozzles 40 outside of the nozzles' 40 spray zones 41. Each of the double plates 82 is arranged with upstream edges 84 relatively distanced one from the other and a common downstream apex 86. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. Arrangement of double plates 82 within wet scrubber tower 16 increases flue gas FG flow velocity and increases flue gas FG contact with alkaline absorbent liquid/slurry AS/at least partially reacted liquid/slurry RS atomised within wet scrubber tower 16. The plurality of double plates 82 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 9:
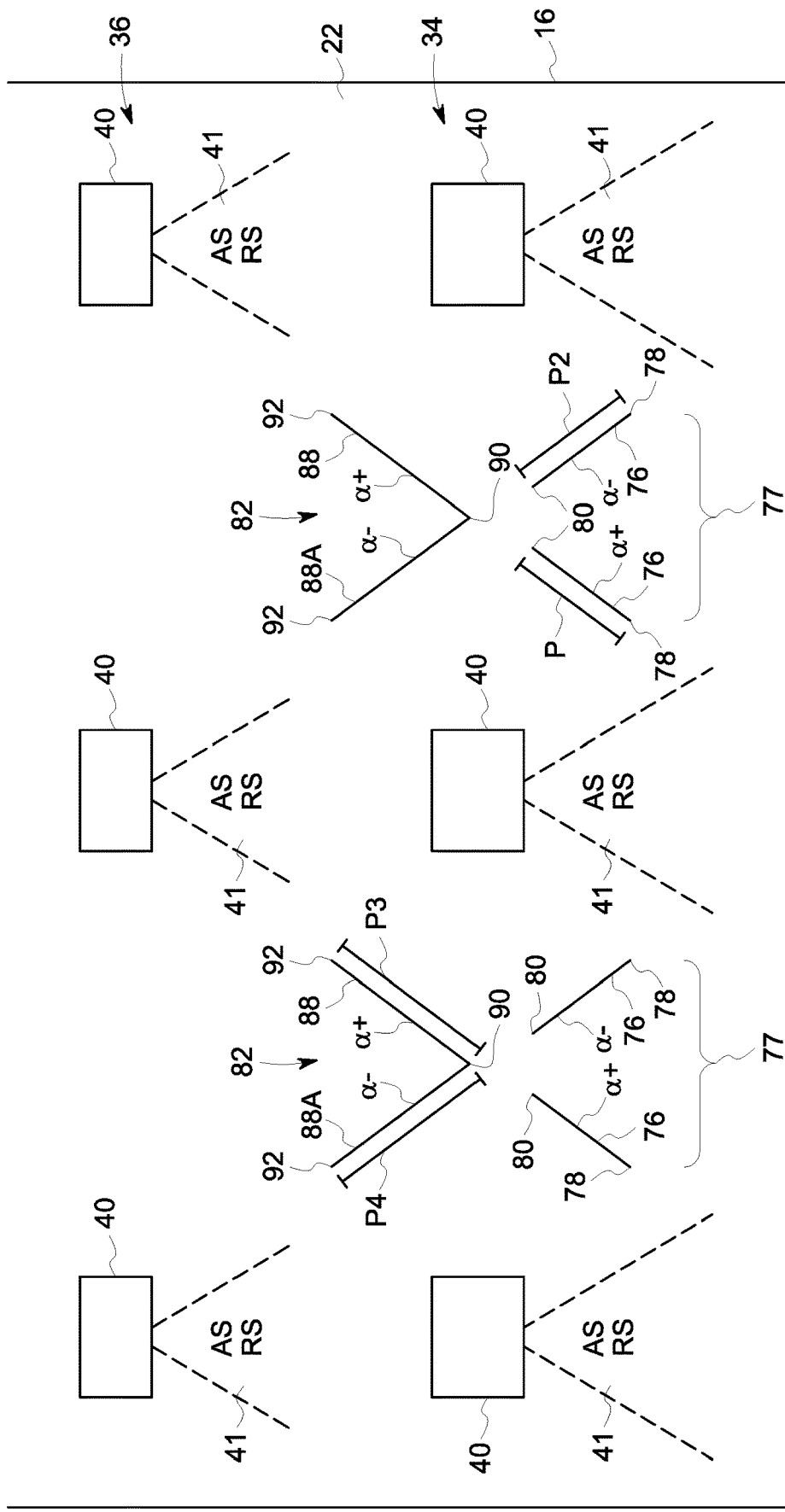
FIG. 9 is a schematic side cross-sectional view of another embodiment of a wet scrubber of the WFGD system of FIG. 1.

FIG. 9 is a schematic illustration of another embodiment of the wet scrubber tower 16, in accordance with the subject disclosure. According to this embodiment, wet scrubber tower 16 comprises within interior area 22 an at least first spray level arrangement 34 and a second spray level arrangement 36 each equipped with a plurality of downwardly spraying nozzles 40, a plurality of single plates 76 outside of the nozzles' 40 spray zones 41, and a plurality of double plates 82 outside of the nozzles' 40 spray zones 41. The plurality of single plates 76 are arranged in pairs 77 between the downwardly spraying nozzles 40. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. The plurality of double plates 82 are each arranged with a common upstream apex 90 arranged between downstream edges 80 of a pair 77 of single plates 76. As such, each of the double plates 82 is arranged with downstream edges 92 relatively distanced one from the other and a common upstream apex 90. Extending from downstream edge 92 to upstream apex 90 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common upstream apex 90. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. This arrangement of single planar plates 76 and double plates 82 within wet scrubber tower 16 increases flue gas FG flow velocity and increases flue gas FG contact with alkaline absorbent liquid/slurry AS/at least partially reacted slurry RS atomised within wet scrubber tower 16. The plurality of single plates 76 and plurality of double plates 82 increase the flue gas FG flow velocity and increase flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 10:
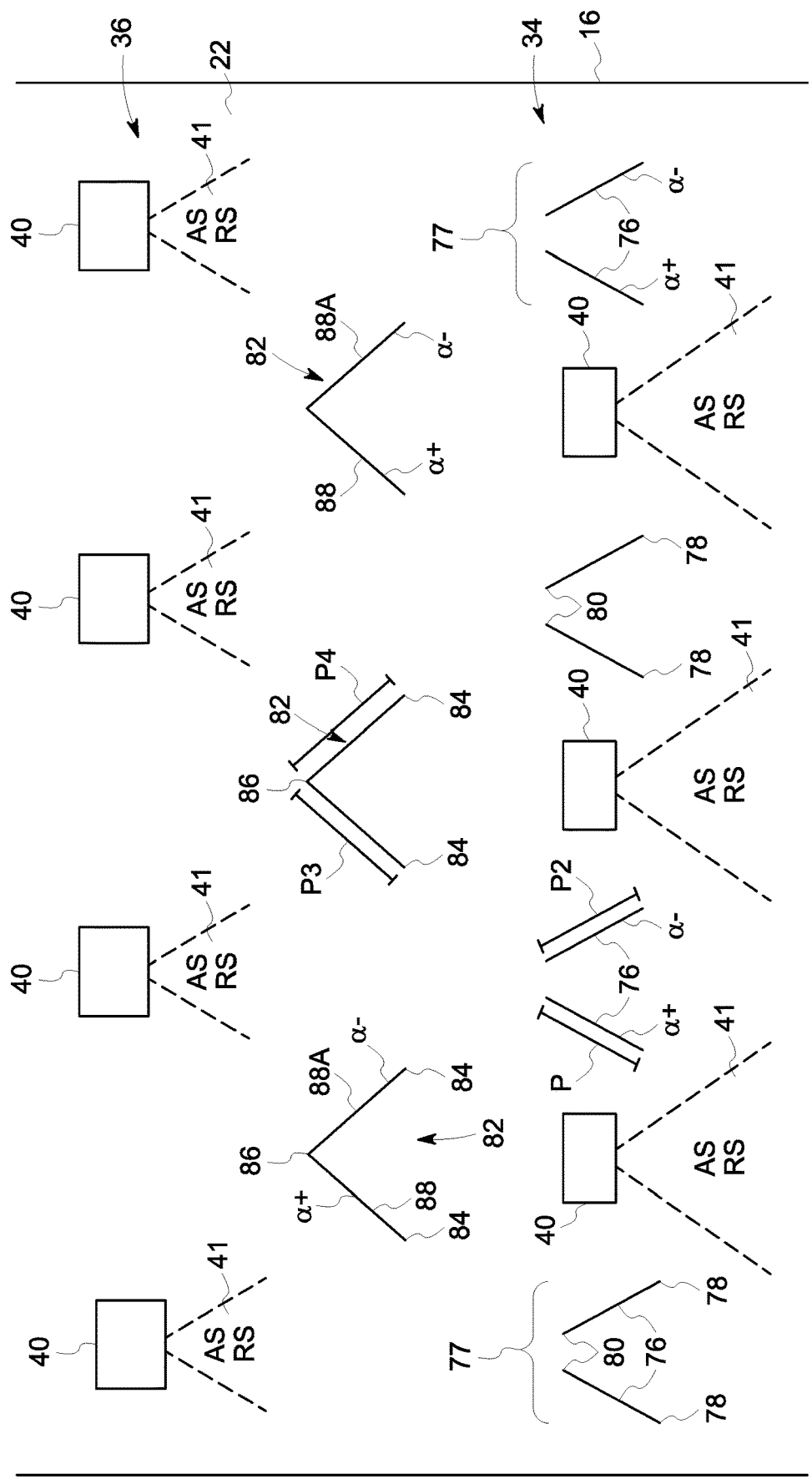
FIG. 10 is a schematic side cross-sectional view of another embodiment of a wet scrubber of the WFGD system of FIG. 1.

FIG. 10 is a schematic illustration of another embodiment of the wet scrubber tower 16, in accordance with the subject disclosure. According to this embodiment, wet scrubber tower 16 comprises within interior area 22 an at least first spray level arrangement 34 and a second spray level arrangement 36 each equipped with a plurality of downwardly spraying nozzles 40, a plurality of single plates 76 outside of the nozzles' 40 spray zones 41, and a plurality of double plates 82 outside of the nozzles' 40 spray zones 41. The plurality of single plates 76 are arranged in pairs 77 between the downwardly spraying nozzles 40. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. The plurality of double plates 82 are each arranged just above each of the downwardly spraying nozzles 40 with a common downstream apex 86 arranged between relatively distanced upstream edges 84. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. This arrangement of single plates 76 and double plates 82 within wet scrubber tower 16 increases flue gas FG flow velocity and increases flue gas FG contact with alkaline absorbent liquid/slurry AS/at least partially reacted slurry RS atomised within wet scrubber tower 16. The plurality of single plates 76 and plurality of double plates 82 increase the flue gas FG flow velocity and increase flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

Figure 11:
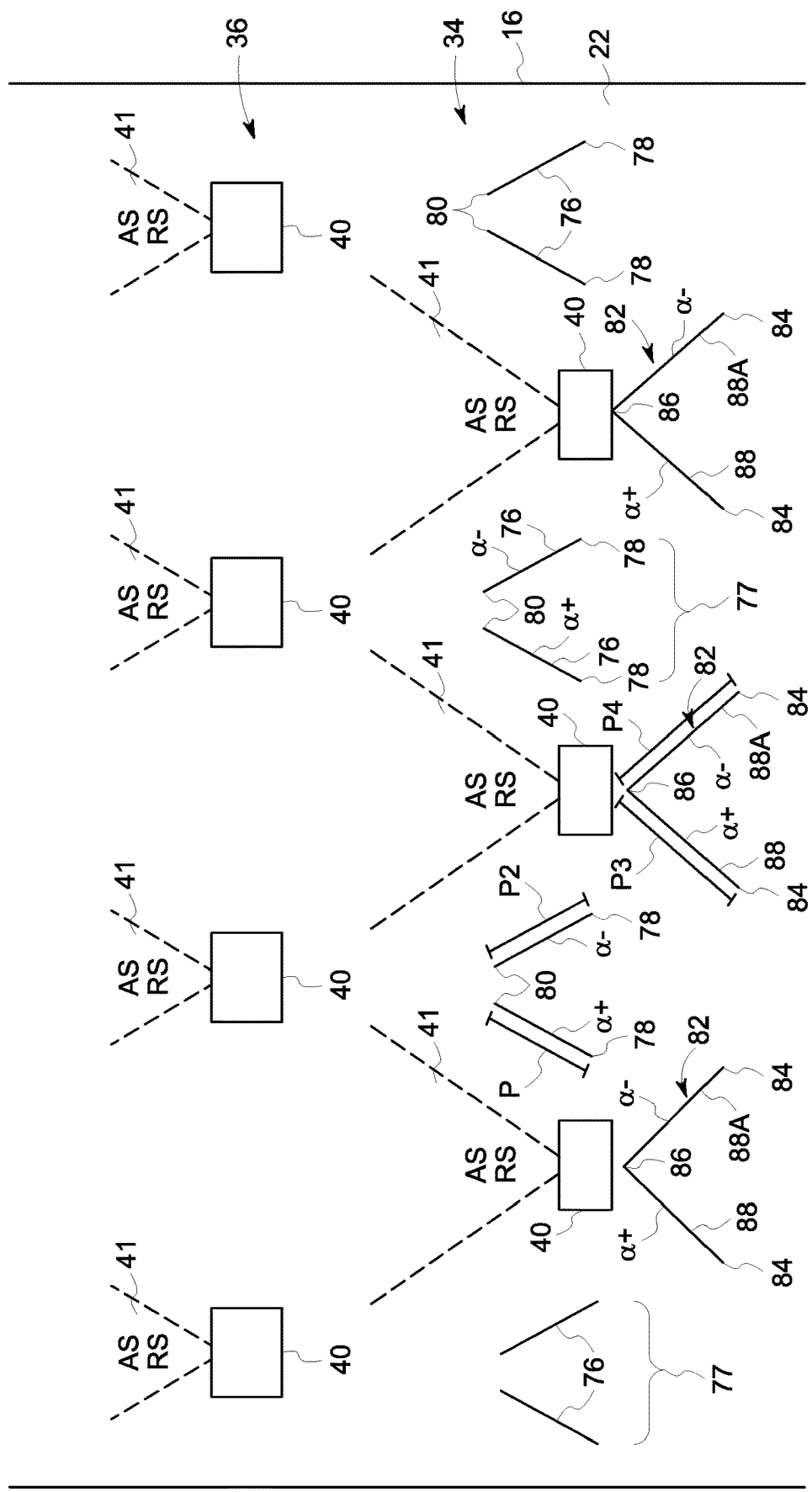
FIG. 11 is a schematic side cross-sectional view of another embodiment of a wet scrubber of the WFGD system of FIG. 1.

FIG. 11 is a schematic illustration another embodiment of the wet scrubber tower 16, in accordance with the subject disclosure. According to this embodiment, wet scrubber tower 16 comprises within interior area 22 an at least first spray level arrangement 34 and a second spray level arrangement 36 each equipped with a plurality of upwardly spraying nozzles 40, a plurality of single plates 76 outside of the nozzles' 40 spray zones 41, and a plurality of double plates 82 outside of the nozzles' 40 spray zones 41. The plurality of single plates 76 are arranged in pairs 77 between the upwardly spraying nozzles 40. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. The plurality of double plates 82 are each arranged with a common downstream apex 86 arranged just below each of the upwardly spraying nozzles 40. As such, each of the double plates 82 is arranged with upstream edges 84 relatively distanced one from the other and a common downstream apex 86. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. This arrangement of single planar plates 76 and double plates 82 within wet scrubber tower 16 increases flue gas FG flow velocity and increases flue gas FG contact with alkaline absorbent liquid/slurry AS/at least partially reacted slurry RS atomised within wet scrubber tower 16. The plurality of single plates 76 and plurality of double plates 82 increase the flue gas FG flow velocity and increase flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas pollutants, such as sulphur oxides and/or particulate matter.

A first method according to the present disclosure comprises equipping an at least first spray level arrangement 34 and an optional second spray level arrangement 36 each with a plurality of downwardly spraying nozzles 40, and arranging a plurality of single plates 76 in pairs 77 between the downwardly spraying nozzles 40 outside of the nozzles' 40 spray zones 41. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. According to this method, the plurality of single plates 76 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least first spray level arrangement 34 with a plurality of downwardly spraying nozzles 40 and an optional second spray level arrangement 36 with a plurality of upwardly spraying nozzles 40, and arranging a plurality of single plates 76 in pairs 77 between the downwardly spraying nozzles 40 outside of the nozzles' 40 spray zones 41 and the upwardly spraying nozzles 46 outside of the nozzles' 40 spray zones 41. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with regard to horizontal, and the other single plate 76 has a plane P2 with a negative angle α− of about 0 degrees to about 60 degrees with regard to horizontal, or about 15 degrees to about 40 degrees with regard to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. According to this method, the plurality of single plates 76 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least first spray level arrangement 34 with a plurality of upwardly spraying, downwardly spraying and/or combination downwardly and upwardly spraying nozzles 40, and arranging a plurality of single plates 76 in pairs 77 between the downwardly spraying, upwardly spraying and/or combination downwardly spraying and upwardly spraying nozzles 40 outside of the nozzles' 40 spray zones 41. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. According to this method, the plurality of single plates 76 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least first spray level arrangement 34 with a plurality of downwardly spraying nozzles 40, and arranging a plurality of double plates 82 between each of the plurality of downwardly spraying nozzles 40 outside of the nozzles' 40 spray zones 41. Each of the double plates 82 is arranged with upstream edges 84 relatively distanced one from the other and a downstream apex 86. Extending from upstream edge 84 to downstream apex 86 are planes P3, P4. Hence, first portion 88 of double plate 82 has a plane P3 with a positive angle $\alpha+$ of about 0 degrees to about 60 degrees with respect to horizontal, or about 15 degrees to about 40 degrees with respect to horizontal, and second portion 88A of double plate 82 has a plane P4 with a negative angle $\alpha-$ of about 0 degrees to about 60 degrees with respect to horizontal, or about 15 degrees to about 40 degrees with respect to horizontal with first portion 88 and second portion 88A joining at downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. According to this method, the plurality of double plates 82 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least a first spray level arrangement 34 with a plurality of downwardly spraying nozzles 40 and a plurality of upwardly spraying nozzles 40, and arranging a plurality of double plates 82 between each of the plurality of downwardly spraying nozzles 40 outside of the nozzles' 40 spray zones 41 and just below each of the plurality of upwardly spraying nozzles 40 outside of the nozzles' 40 spray zones 41. Each of the double plates 82 is arranged with upstream edges 84 relatively distanced one from the other and a downstream apex 86. Extending from upstream edge 84 to downstream apex 86 are planes P3, P4. Hence, first portion 88 of double plate 82 has a plane P3 with a positive angle $\alpha+$ of about 0 degrees to about 60 degrees with respect to horizontal, or about 15 degrees to about 40 degrees with respect to horizontal, and second portion 88A of double plate 82 has a plane P4 with a negative angle $\alpha-$ of about 0 degrees to about 60 degrees with respect to horizontal, or about 15 degrees to about 40 degrees with respect to horizontal with first portion 88 and second portion 88A joining at downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. According to this method, the plurality of double plates 82 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least first spray level arrangement 34 with a plurality of downwardly spraying nozzles 40 and a plurality of upwardly spraying nozzles 40, arranging a plurality of double plates 82 between each of the plurality of downwardly spraying nozzles 40 outside of the nozzles' 40 spray zones 41 and just below each of the upwardly spraying nozzles 40 outside of the nozzles' 40 spray zones 41, and arranging a plurality of double plates 82 between each of the plurality of upwardly spraying nozzles 40 outside of the nozzles' 40 spray zones 41 and just above each of the downwardly spraying nozzles 40 outside of the nozzles' 40 spray zones 41. Each of the double plates 82 is arranged with upstream edges 84 relatively distanced one from the other and a downstream apex 86. Extending from upstream edge 84 to downstream apex 86 are planes P3, P4. Hence, first portion 88 of double plate 82 has a plane P3 with a positive angle $\alpha+$ of about 0 degrees to about 60 degrees with respect to horizontal, or about 15 degrees to about 40 degrees with respect to horizontal, and second portion 88A of double plate 82 has a plane P4 with a negative angle $\alpha-$ of about 0 degrees to about 60 degrees with respect to horizontal, or about 15 degrees to about 40 degrees with respect to horizontal with first portion 88 and second portion 88A joining at downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. According to this method, the plurality of double plates 82 increases the flue gas FG flow velocity and increases flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least first spray level arrangement 34 with a plurality of downwardly spraying nozzles 40, and arranging a plurality of single plates 76 and a plurality of double plates 82 between the plurality of downwardly spraying nozzles 40 outside of the nozzles' 40 spray zones 41. The plurality of single plates 76 are arranged in pairs 77 between the downwardly spraying nozzles 40. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. The plurality of double plates 82 are each arranged with a common upstream apex 90 arranged between downstream edges 80 of a pair 77 of single plates 76. As such, each of the double plates 82 is arranged with downstream edges 92 relatively distanced one from the other and a common upstream apex 90. Extending from downstream edge 92 to upstream apex 90 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common upstream apex 90. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. According to this method, the plurality of single plates 76 and the plurality of double plates 82 increase the flue gas FG flow velocity and increase flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least a first spray level arrangement 34 with a plurality of downwardly spraying nozzles 40, and arranging a plurality of single plates 76 in pairs 77 between the downwardly spraying nozzles 40 outside of the nozzles' 40 spray zones 41 and a plurality of double plates 82 between the single plates 76 in pairs 77 just above each of the downwardly spraying nozzles 40 outside of the nozzles' 40 spray zones 41. The plurality of single plates 76 are arranged in pairs 77 between the downwardly spraying nozzles 40. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. The plurality of double plates 82 are each arranged between the plurality of single plates 76 arranged in pairs 77, just above each downwardly spraying nozzle 40, with a common downstream apex 86 arranged between upstream edges 84. As such, each of the double plates 82 is arranged with upstream edges 84 relatively distanced one from the other and a common downstream apex 86. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. According to this method, the plurality of single plates 76 and the plurality of double plates 82 increase the flue gas FG flow velocity and increase flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Another method according to the present disclosure comprises equipping an at least first spray level arrangement 34 with a plurality of upwardly spraying nozzles 40, and arranging a plurality of single plates 76 between the plurality of upwardly spraying nozzles 40 outside of the nozzles' 40 spray zones 41, and a plurality of double plates 82 between the plurality of single plates 76 just below each of the upwardly spraying nozzles 40 outside of the nozzles' 40 spray zones 41. The plurality of single plates 76 are arranged in pairs 77 between the upwardly spraying nozzles 40. Each of the single plates 76 of the pairs 77 is arranged with an upstream edge 78 relatively distanced one from the other and a downstream edge 80 in relatively close proximity one to the other. Extending from upstream edge 78 to downstream edge 80 is a plane P/P2. Hence, for each pair 77, one single plate 76 has a plane P with a positive angle α+ of about 0 degrees to about 60 degrees with respect to horizontal, or about 15 degrees to about 40 degrees with respect to horizontal, and the other single plate 76 has a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. The plurality of double plates 82 are each arranged with a common downstream apex 86 arranged between upstream edges 84, below an upwardly spraying nozzle 40. As such, each of the double plates 82 is arranged with upstream edges 84 relatively distanced one from the other and a common downstream apex 86. Extending from upstream edge 84 to downstream apex 86 are planes P3, P4. Hence, first portion 88 of double plate 82 has a plane P3 with a positive angle α+ of about 0 degrees to about 60 degrees with respect to horizontal, or about 15 degrees to about 40 degrees with respect to horizontal, and second portion 88A of double plate 82 has a plane P4 with a negative angle α− of about 0 degrees to about 60 degrees with respect to horizontal, or about 15 degrees to about 40 degrees with respect to horizontal with first portion 88 and second portion 88A joining at common downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. According to this method, the plurality of single plates 76 and the plurality of double plates 82 increase the flue gas FG flow velocity and increase flue gas FG contact with alkaline absorbent liquid/slurry AS/at least partially reacted slurry RS atomised within the wet scrubber tower 16 to generate an increased shear force impact of flue gas FG with alkaline absorbent liquid/slurry AS/at least partially reacted slurry RS. This increased shear force impact of flue gas FG with alkaline absorbent liquid/slurry AS/at least partially reacted slurry RS yields very efficient absorption/capture of flue gas FG pollutants, such as sulphur oxides and/or particulate matter.

Nozzles 40 as described above atomize in a spray zone 41 alkaline absorbent liquid/slurry AS/at least partially reacted slurry RS supplied thereto to generate by means of the single plates 76 and double plates 82 an increased shear force impact between the alkaline absorbent liquid/slurry AS/at least partially reacted slurry RS and the flue gas FG. Typically, nozzles 40 provide an alkaline absorbent liquid/slurry AS/at least partially reacted slurry RS spray zone 41 at an angle $\alpha^2$ of about 60 degrees to about 180 degrees, and more typically about 90 degrees to about 130 degrees. Under the momentum of the atomized alkaline absorbent liquid/slurry AS/at least partially reacted slurry RS from nozzles 40, flue gas FG is forced away from nozzles 40 toward open areas between adjacent nozzles 40. Hence, the flue gas FG flows as far away from nozzles' 40 spray zones 41 as possible. According to the subject WFGD system 12 and method, single plates 76 and/or double plates 82 direct flue gas FG flow toward alkaline absorbent liquid/slurry AS/at least partially reacted slurry RS atomized by nozzles 40. Single plates 76 and/or double plates 82 arranged outside of the nozzles' 40 spray zones 41 also increase flue gas FG velocity to about 5 m/s to about 15 m/s, or about 6 m/s to about 10 m/s. With such a relatively high flue gas FG velocity, alkaline absorbent liquid/slurry AS/at least partially reacted slurry RS atomized by nozzles 40 has an increased shear force impact with the flue gas FG. Increased shear force impact of alkaline absorbent liquid/slurry AS/at least partially reacted slurry RS results in increased sulphur oxide and/or particulate matter absorption/capture levels and thereby efficient removal of sulphur oxides and/or particulate matter from the flue gas FG.

Figure 12:
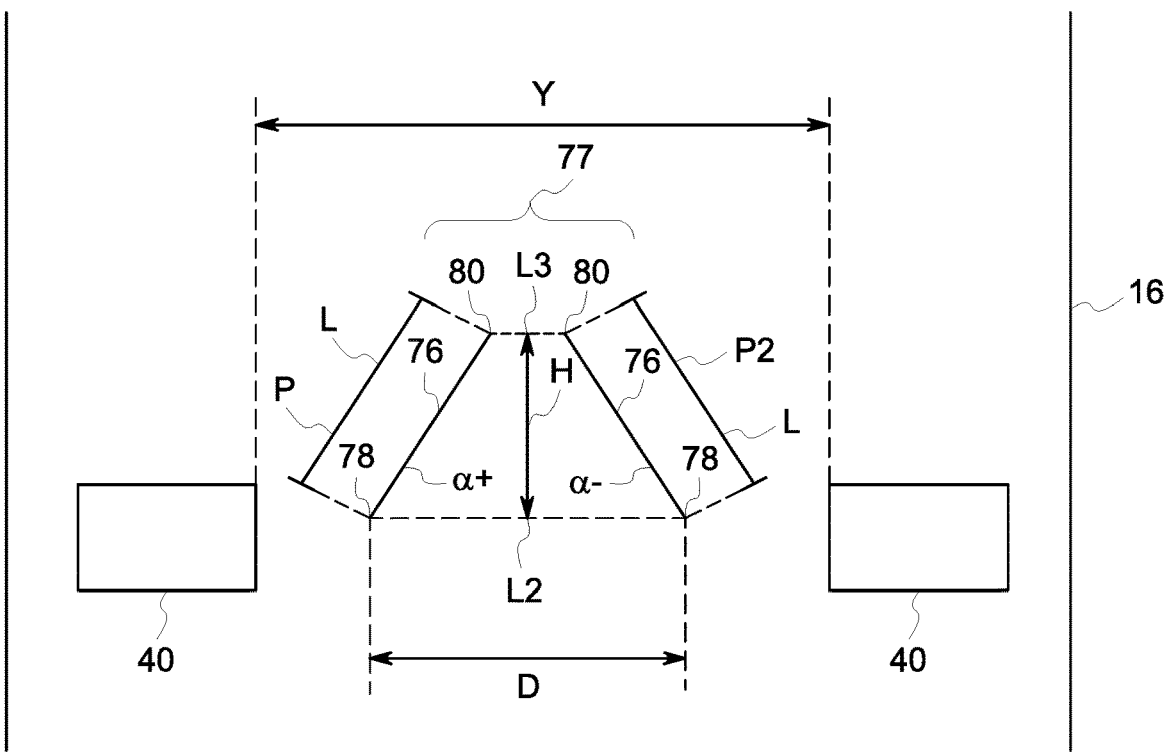
FIG. 12 is a schematic side cross-sectional view of two nozzles and two single plates of a wet scrubber of the WFGD system of FIGS. 2-5 and 9-11.
Figure 13:
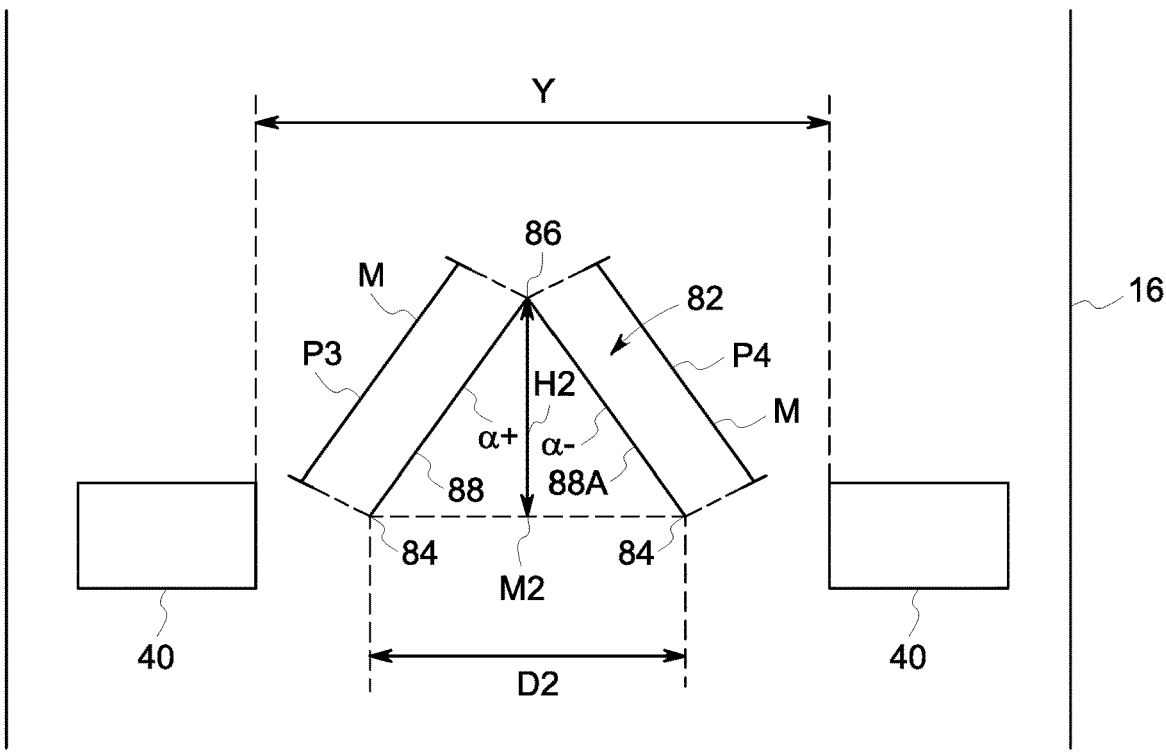
FIG. 13 is a schematic side cross-sectional view of two nozzles and a double plate of a wet scrubber of the WFGD system of FIGS. 6-8 and 10-11.
Figure 14:
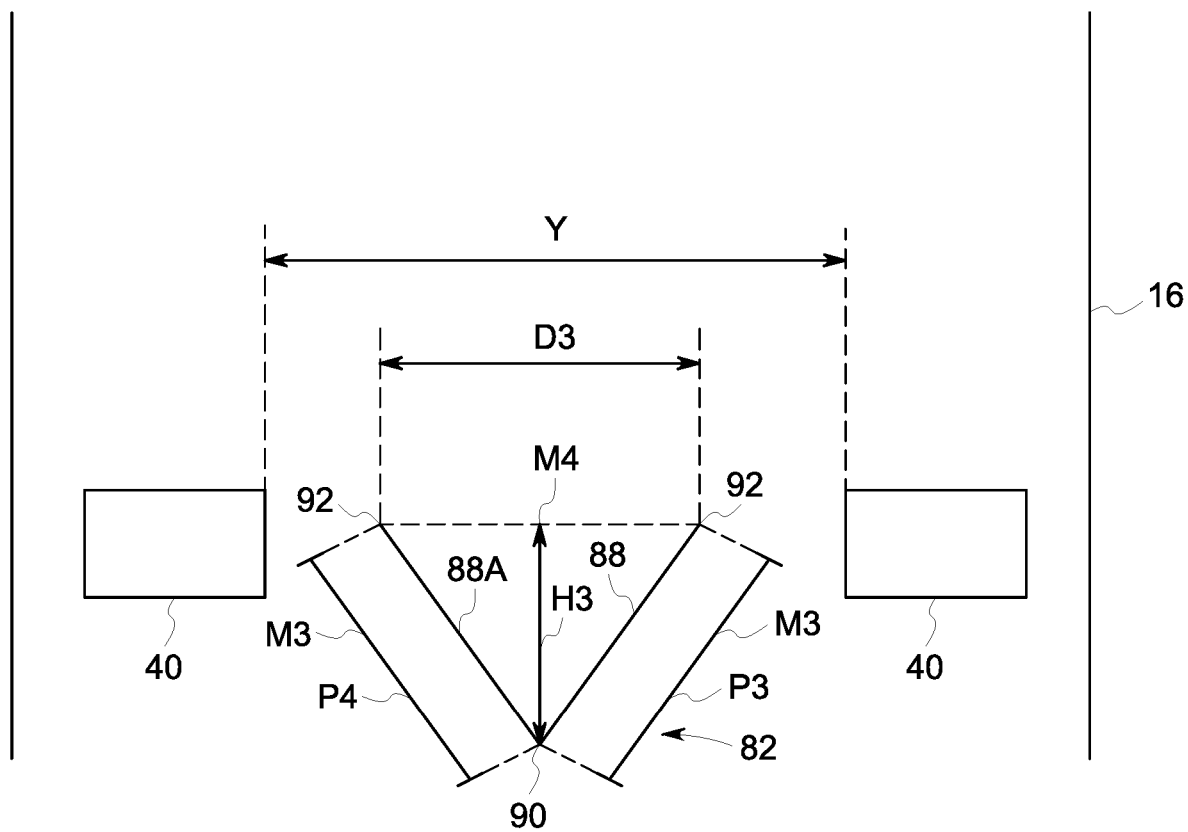
FIG. 14 is a schematic side cross-sectional view of two nozzles and a double plate of a wet scrubber of the WFGD system of FIG. 9.

Illustrated in FIG. 12 are nozzles 40 and single plates 76 arranged in pairs 77 therebetween. Between adjacent nozzles 40 is a distance Y. Preferably, the distance D between upstream edges 78 of planar plates 76 is less than Y/2. Depending on the angle of one single plate 76 having a plane P with a positive angle α+ of about 0 degrees to about 60 degrees with respect to horizontal, or about 15 degrees to about 40 degrees with respect to horizontal, and the other single plate 76 having a plane P2 with a negative angle α− of about 0 degrees to about 60 degrees with respect to horizontal, or about 15 degrees to about 40 degrees with respect to horizontal, and the length L of each of the single plates 76 measuring plane P/P2 from upstream edge 78 to downstream edge 80, the height H of the pair 77 measuring from a midpoint L2 between the upstream edges 78 to a midpoint L3 between the downstream edges 80 may vary. Likewise, as illustrated in FIG. 13, are nozzles 40 and double plate 82 arranged therebetween. Between adjacent nozzles 40 is a distance Y. Preferably, the distance D2 between upstream edges 84 of double plate 82 is less than Y/2. Depending on the angle of first portion 88 of double plate 82 having a plane P3 with a positive angle α+ of about 0 degrees to about 60 degrees with respect to horizontal, or about 15 degrees to about 40 degrees with respect to horizontal, and second portion 88A of double plate 82 having a plane P4 with a negative angle α− of about 0 degrees to about 60 degrees with respect to horizontal, or about 15 degrees to about 40 degrees with respect to horizontal, and the length M of each of the first and second portion 88, 88A, the height H2 of the double plate 82 measuring from a midpoint M2 between the upstream edges 84 to downstream apex 86 may vary. Similarly, as illustrated in FIG. 14, are nozzles 40 and double plate 82 arranged therebetween. Between adjacent nozzles 40 is a distance Y. Preferably, the distance D3 between downstream edges 92 of double plate 82 is less than Y/2. Depending on the angle of first portion 88 of double plate 82 having a plane P3 with a positive angle α+ of about 0 degrees to about 60 degrees with respect to horizontal, or about 15 degrees to about 40 degrees with respect to horizontal, and second portion 88A of double plate 82 having a plane P4 with a negative angle α− of about 0 degrees to about 60 degrees with respect to horizontal, or about 15 degrees to about 40 degrees with respect to horizontal, and the length M3 of each of the first and second portion 88, 88A, the height H3 of the double plate 82 measuring from a midpoint M4 between the downstream edges 92 to upstream apex 90, may vary.

Figure 16:
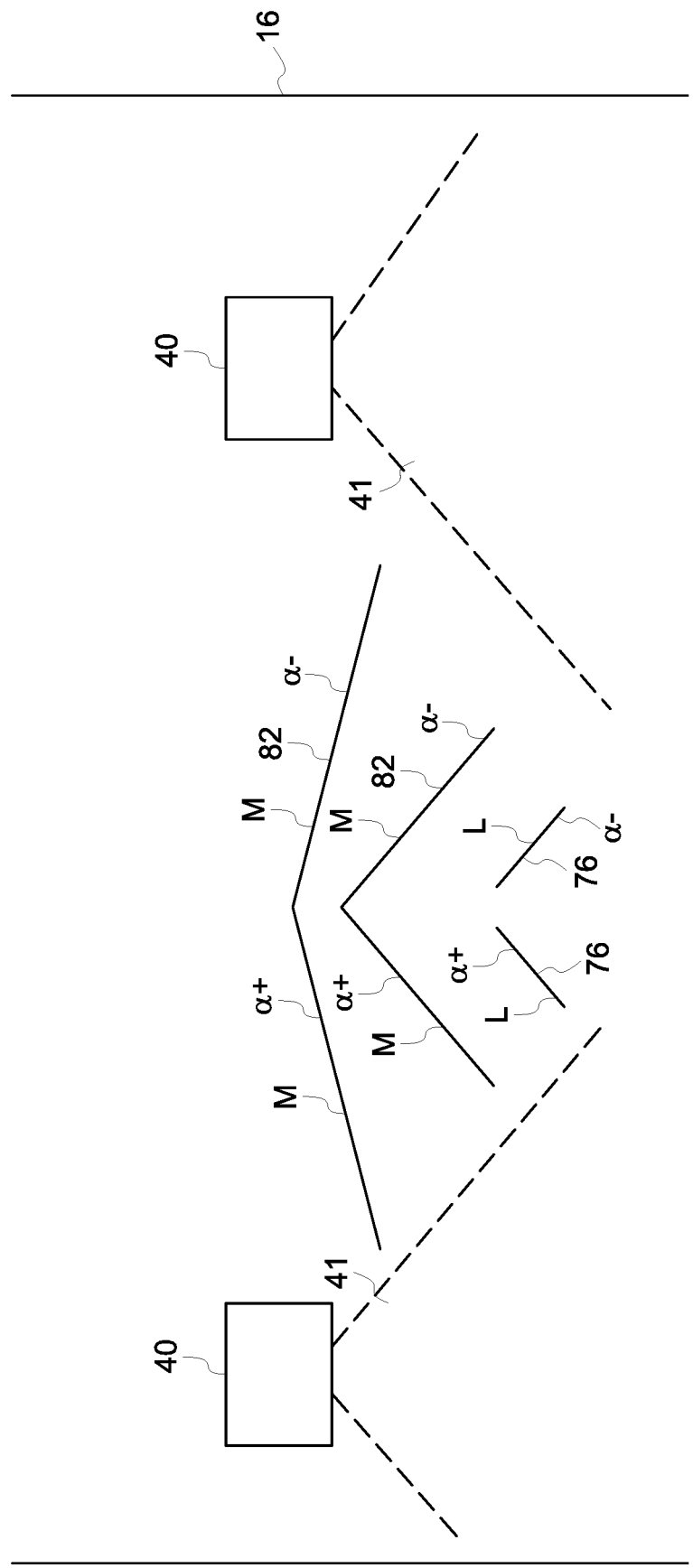
FIG. 16 is a schematic side cross-sectional view of two nozzles each with a spray zone and various double plates arranged between the two nozzles outside of the spray zones.

FIG. 16 illustrates a wet scrubber tower 16 with nozzles 40 each having a spray zone 41. Arranged outside of the nozzles' 40 spray zones 41 are a plurality of plates 76, 82. The plurality of plates 76, 82 are depicted in FIG. 16 as examples of various lengths L, M, M3, and examples of various angles α+, α−, contemplated in accordance with the subject disclosure. All plates 76, 82 are arranged outside of the nozzles' 40 spray zones 41 to avoid any direct impact, deflection, or alteration of alkaline absorbent liquid/slurry AS/at least partially reacted slurry RS spray within the wet scrubber tower 16 due to plates 76, 82.

In summary, the subject WFGD system 12 comprises a wet scrubber tower 16, an at least first spray level arrangement 34 equipped with a plurality of nozzles 40, arranged within the wet scrubber tower 16 above a flue gas inlet 24, an optional second to tenth spray level arrangement 36 equipped with a plurality of nozzles 40, arranged above the at least a first spray level arrangement 34 within the wet scrubber tower 16, and a plurality of plates 76, 82 arranged between the plurality of nozzles 40 outside of the nozzles' 40 spray zones 41 directing flue gas FG from the flue gas inlet 24 into an alkaline absorbent/liquid slurry AS/at least partially reacted slurry RS dispersed by the plurality of nozzles 40 to reduce flue gas FG sulphur oxides and/or particulate matter. As such, the plurality of nozzles 40 of the at least first spray level arrangement 34 spray alkaline absorbent liquid/slurry AS/at least partially reacted slurry RS downwardly, upwardly and/or downwardly and upwardly. Further, the plurality of nozzles 40 of the at least first spray level arrangement 34 may spray in a like direction, in a differing direction, or in a like and a differing direction from that of the plurality of nozzles 40 of the optional second to tenth spray level arrangement 36. According to the WFGD system 12, the plurality of plates 76, 82 comprises single plates 76 arranged in pairs 77, with each of the single plates 76 arranged with an upstream edge 78 relatively distanced one from another and a downstream edge 80 in relatively close proximity one to another. Extending from upstream edge 78 to downstream edge 80 is a plane P/P2. Further, the plurality of plates 76, 82 comprises single plates 76 arranged in pairs 77, with a first single plate 76 of a pair 77 having a plane P with a positive angle α+ of about 0 degrees to about 60 degrees with respect to horizontal, or about 15 degrees to about 40 degrees with respect to horizontal, and a second single plate 76 of the pair 77 having a plane P2 with a negative angle α− of about 0 degrees to about 60 degrees with respect to horizontal, or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. Further, the plurality of plates 76, 82 comprises double plates 82 arranged with a first portion 88 having a plane P3 with a positive angle of about 0 degrees to about 60 degrees with respect to horizontal or about 15 degrees to about 40 degrees with respect to horizontal, and a first upstream edge 84 relatively distanced from a second upstream edge 84 of a second portion 88A having a plane P4 with a negative angle of about 0 degrees to about 60 degrees with respect to horizontal or about 15 degrees to about 40 degrees with respect to horizontal, with the first portion 88 and the second portion 88A joined at a downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. Also, the plurality of plates 76, 82 comprises double plates 82 arranged with a first portion 88 having a plane P3 with a positive angle of about 0 degrees to about 60 degrees with respect to horizontal or about 15 degrees to about 40 degrees with respect to horizontal, and a first downstream edge 92 relatively distanced from a second downstream edge 92 of a second portion 88A having a plane P4 with a negative angle of about 0 degrees to about 60 degrees with respect to horizontal or about 15 degrees to about 40 degrees with respect to horizontal, with the first portion 88 and the second portion 88A joined at an upstream apex 90. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. Still further, the plurality of plates 76, 82 comprises single plates 76 arranged in pairs 77, with a first single plate 76 of a pair 77 having a plane P with a positive angle of about 0 degrees to about 60 degrees with respect to horizontal or about 15 degrees to about 40 degrees with respect to horizontal, and a second single plate 76 of the pair 77 having a plane P2 with a negative angle of about 0 degrees to about 60 degrees with respect to horizontal or about 15 degrees to about 40 degrees with respect to horizontal, and double plates 82 arranged downstream of each pair 77 of single plates 76 with the double plates 82 arranged with a first portion 88 having a plane P3 with a positive angle of about 0 degrees to about 60 degrees with respect to horizontal or about 15 degrees to about 40 degrees with respect to horizontal, and a first downstream edge 92 relatively distanced from a second downstream edge 92 of a second portion 88A having a plane P4 with a negative angle of about 0 degrees to about 60 degrees with respect to horizontal or about 15 degrees to about 40 degrees with respect to horizontal, with the first portion 88 and the second portion 88A joined at an upstream apex 90. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. Further, first portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Still further, one or more double plates 82 may include one or more perforations 99 therethrough, such as illustrated in FIG. 15 with respect to single plate 76A.

In summary, the subject method of WFGD of a flue gas FG comprising sulphur oxides comprises equipping a wet scrubber tower 16 with an at least first spray level arrangement 34 comprising a plurality of nozzles 40, above a flue gas inlet 24, equipping a wet scrubber tower 16 with an optional second to tenth spray level arrangement 36 comprising a plurality of nozzles 40, above the at least first spray level arrangement 34, and arranging a plurality of plates 76, 82 between the plurality of nozzles 40 outside of the nozzles' 40 spray zones 41 to direct flue gas FG from the flue gas inlet 24 into an alkaline absorbent liquid/slurry AS/at least partially reacted slurry RS dispersed by the plurality of nozzles 40 to reduce flue gas FG sulphur oxides and/or particulate matter. According to the method, the plurality of nozzles 40 of the at least first spray level arrangement 34 spray alkaline absorbent liquid/slurry AS/at least partially reacted slurry RS downwardly, upwardly, and/or downwardly and upwardly. The plurality of nozzles 40 of the at least first spray level arrangement 34 spray in a like direction, in a differing direction, or in a like and a differing direction from that of the plurality of nozzles 40 of the optional second to tenth spray level arrangement 36. Also according to the method, the plurality of plates 76, 82 comprises single plates 76 arranged in pairs 77, with each of the single plates 76 arranged with an upstream edge 78 relatively distanced one from another and a downstream edge 80 in relatively close proximity one to another. Extending from upstream edge 78 to downstream edge 80 is a plane P/P2. Further, the plurality of plates 76, 82 comprises single plates 76 arranged in pairs 77, with a first single plate 76 of a pair 77 having a plane P with a positive angle α+ of about 0 degrees to about 60 degrees with respect to horizontal or about 15 degrees to about 40 degrees with respect to horizontal, and a second single plate 76 of the pair 77 having a plane P2 with a negative angle α− of about 0 degrees to about 60 degrees with respect to horizontal or about 15 degrees to about 40 degrees with respect to horizontal. Single plates 76 may be planar, curved, corrugated, or otherwise formed to achieve desired flue gas FG flow within wet scrubber tower 16. Likewise, single plates 76 may be square, circular, triangular, oblong, or other two-dimensional geometric or non-geometric form to achieve desired flue gas FG flow within wet scrubber tower 16. As an alternative, as illustrated in FIG. 15, a single plate 76A may be an open base 97 hollow interior 98 cone, triangular prism, pyramid, or other three-dimensional geometric or non-geometric form to achieve desired flue gas FG flow within wet scrubber tower 16. Further, one or more single plates 76A, as well as single plates 76 and double plates 82, may include one or more perforations 99 extending therethrough, such as from exterior surface 96 to interior surface 96A. Further, the plurality of plates 76, 82 comprises double plates 82 arranged with a first portion 88 having a plane P3 with a positive angle α+ of about 0 degrees to about 60 degrees with respect to horizontal or about 15 degrees to about 40 degrees with respect to horizontal, and a first upstream edge 84 relatively distanced from a second upstream edge 84 of a second portion 88A having a plane P4 with a negative angle α− of about 0 degrees to about 60 degrees with respect to horizontal or about 15 degrees to about 40 degrees with respect to horizontal, with the first portion 88 and the second portion 88A joined at a downstream apex 86. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A. Still further according to the subject method, the plurality of plates 76, 82 comprises double plates 82 arranged with a first portion 88 having a plane P3 with a positive angle α+ of about 0 degrees to about 60 degrees with respect to horizontal or about 15 degrees to about 40 degrees with respect to horizontal, and a first downstream edge 92 relatively distanced from a second downstream edge 92 of a second portion 88A having a plane P4 with a negative angle α− of about 0 degrees to about 60 degrees with respect to horizontal or about 15 degrees to about 40 degrees with respect to horizontal, with the first portion 88 and the second portion 88A joined at an upstream apex 90. First portions 88 and second portions 88A may be planar, curved, corrugated, or otherwise formed to achieve desired flue gas FG flow within wet scrubber tower 16. Likewise, first portions 88 and second portions 88A may be square, circular, oblong, or other two-dimensional geometric or non-geometric form to achieve desired flue gas FG flow within wet scrubber tower 16. Further, one or more double plates 82 may include one or more perforations 99 therethrough, such as illustrated in FIG. 15 with respect to single plate 76A.

While the subject disclosure has been described with reference to a number of embodiments, those skilled in the art will understand that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, the subject disclosure is not intended to be limited to the particular embodiments disclosed for the subject systems and methods, but that the subject disclosure will include all embodiments falling within the scope of the appended claims. Moreover, the use of the terms "first", "second", etc., do not denote any order or importance, but rather are used to distinguish one element from another. Further, use of the terms "downstream" and "upstream" are relative, with regard to an overall general direction of flue gas FG flow through wet scrubber tower 16.

The invention claimed is:

1. A wet flue gas desulphurisation system (12) comprising:
   a wet scrubber tower (16),
   an at least first spray level arrangement (34) equipped with a plurality of nozzles (40), arranged within the wet scrubber tower (16) above a flue gas inlet (24), and
   a plurality of plates (76, 76A, 82) arranged between the plurality of nozzles (40) of the at least first spray level arrangement (34) directing flue gas from the flue gas inlet (24) into an absorbent liquid or slurry dispersed by the plurality of nozzles (40) to reduce flue gas sulphur oxides;
   wherein the plurality of plates (76, 76A, 82) comprises single plates (76) arranged in pairs (77), with each of the single plates (76) arranged with an upstream edge (78) relatively distanced one from another and a downstream edge (80) in relatively close proximity one to another.

2. The system (12) of claim 1, wherein the plurality of nozzles (40) of the at least first spray level arrangement (34) spray absorbent liquid or slurry downwardly, upwardly, and/or downwardly and upwardly.

3. The system (12) of claim 1, wherein the plurality of nozzles (40) of the at least first spray level arrangement (34) may spray in a like direction, in a differing direction, or in a like and a differing direction from that of a plurality of nozzles (40) of a second spray level arrangement (36).

4. The system (12) of claim 1, wherein the plurality of plates (76, 76A, 82) comprises single plates (76) arranged in pairs (77), with a first single plate (76) of a pair (77) having a plane (P) with a positive angle ($\alpha+$) of about 0 degrees to about 60 degrees, and a second single plate (76) of the pair (77) having a plane (P2) with a negative angle ($\alpha-$) of about 0 degrees to about 60 degrees.

5. The system (12) of claim 1, wherein the plurality of plates (76, 76A, 82) comprises double plates (82) arranged with a first portion (88) having a plane (P3) with a positive angle ($\alpha+$) of about 0 degrees to about 60 degrees and a first upstream edge (84) relatively distanced from a second upstream edge (84) of a second portion (88A) having a plane (P4) with a negative angle ($\alpha-$) of about 0 degrees to about 60 degrees, with the first portion (88) and the second portion (88A) joined at a downstream apex (86).

6. The system (12) of claim 1, wherein the plurality of plates (76, 76A, 82) comprises double plates (82) arranged with a first portion (88) having a plane (P3) with a positive angle ($\alpha+$) of about 0 degrees to about 60 degrees and a first downstream edge (92) relatively distanced from a second downstream edge (92) of a second portion (88A) having a plane (P4) with a negative angle ($\alpha-$) of about 0 degrees to about 60 degrees, with the first portion (88) and the second portion (88A) joined at an upstream apex (90).

7. The system (12) of claim 1, wherein the plurality of plates (76, 76A, 82) comprises single plates (76) arranged in pairs (77), with a first single plate (76) of a pair (77) having a plane (P) with a positive angle ($\alpha+$) of about 0 degrees to about 60 degrees, and a second single plate (76) of the pair (77) having a plane (P2) with a negative angle ($\alpha-$) of about 0 degrees to about 60 degrees, and double plates (82) arranged downstream of each pair (77) of single plates (76) with the double plates (82) arranged with a first portion (88) having a plane (P3) with a positive angle ($\alpha+$) of about 0 degrees to about 60 degrees and a first downstream edge (78) relatively distanced from a second downstream edge (78) of a second portion (88A) having a plane (P4) with a negative angle ($\alpha-$) of about 0 degrees to about 60 degrees, with the first portion (88) and the second portion (88A) joined at an upstream apex (86).

8. The system (12) of claim 1, wherein the plurality of plates (76, 76A, 82) are positioned at a same vertical location as the plurality of nozzles (40).

9. A method of wet flue gas desulphurisation of a flue gas comprising sulphur oxides comprising:
   equipping a wet scrubber tower (16) with an at least first spray level arrangement (34) comprising a plurality of nozzles (40), above a flue gas inlet (24), and
   arranging a plurality of plates (76, 76A, 82) between the plurality of nozzles (40) of the at least first spray level arrangement (34) to direct flue gas from the flue gas inlet (24) into an absorbent liquid or slurry dispersed by the plurality of nozzles (40) to reduce flue gas sulphur oxides;
   wherein the plurality of plates (76, 76A, 82) comprises single plates (76) arranged in pairs (77), with each of the single plates (76) arranged with an upstream edge (78) relatively distanced one from another and a downstream edge (80) in relatively close proximity one to another.

10. The method of claim 9, wherein the plurality of nozzles (40) of the at least first spray level arrangement (34) may spray absorbent liquid or slurry downwardly, upwardly, and/or downwardly and upwardly.

11. The method of claim 9, wherein the plurality of nozzles (40) of the at least first spray level arrangement (34) may spray in a like direction, in a differing direction, or in a like and a differing direction from that of a plurality of nozzles (40) of a second spray level arrangement (36).

12. The method of claim 9, wherein the plurality of plates (76, 76A, 82) comprises single plates (76) arranged in pairs (77), with a first single plate (76) of a pair (77) having a plane (P) with a positive angle ($\alpha+$) of about 0 degrees to about 60 degrees, and a second single plate (76) of the pair (77) having a plane (P2) with a negative angle ($\alpha-$) of about 0 degrees to about 60 degrees.

13. The method of claim 9, wherein the plurality of plates (76, 76A, 82) comprises double plates (82) arranged with a first portion (88) having a plane (P3) with a positive angle ($\alpha+$) of about 0 degrees to about 60 degrees and a first upstream edge (84) relatively distanced from a second upstream edge (84) of a second portion (88A) having a plane (P4) with a negative angle ($\alpha-$) of about 0 degrees to about 60 degrees, with the first portion (88) and the second portion (88A) joined at a downstream apex (86).

14. The method of claim 9, wherein the plurality of plates (76, 76A, 82) comprises double plates (82) arranged with a first portion (88) having a plane (P3) with a positive angle ($\alpha+$) of about 0 degrees to about 60 degrees and a first downstream edge (92) relatively distanced from a second downstream edge (92) of a second portion (88A) having a plane (P4) with a negative angle ($\alpha-$) of about 0 degrees to about 60 degrees, with the first portion (88) and the second portion (88A) joined at an upstream apex (90).

15. The method of claim 9, wherein the plurality of plates (76, 76A, 82) are positioned at a same vertical location as the plurality of nozzles (40).

16. A wet flue gas desulphurisation system (12) comprising:
- a wet scrubber tower (16),
- an at least first spray level arrangement (34) equipped with a plurality of nozzles (40), arranged within the wet scrubber tower (16) above a flue gas inlet (24), and
- a plurality of plates (76, 76A, 82) arranged between the plurality of nozzles (40) of the at least first spray level arrangement (34) directing flue gas from the flue gas inlet (24) into an absorbent liquid or slurry dispersed by the plurality of nozzles (40) to reduce flue gas sulphur oxides;
- wherein the plurality of plates (76, 76A, 82) are positioned at a same vertical location as the plurality of nozzles (40).

* * * * *